US011699780B2

(12) United States Patent
Milobar et al.

(10) Patent No.: US 11,699,780 B2
(45) Date of Patent: Jul. 11, 2023

(54) ELECTRICALLY COUPLED ELECTRODES, AND ASSOCIATED ARTICLES AND METHODS

(71) Applicant: Sion Power Corporation, Tucson, AZ (US)

(72) Inventors: Daniel G. Milobar, Tucson, AZ (US); Shane Harrel, Tucson, AZ (US)

(73) Assignee: Sion Power Corporation, Tucson, AZ (US)

(*) Notice: Subject to any disclaimer, the term of this patent is extended or adjusted under 35 U.S.C. 154(b) by 208 days.

(21) Appl. No.: 16/879,839

(22) Filed: May 21, 2020

(65) Prior Publication Data

US 2020/0373551 A1 Nov. 26, 2020

Related U.S. Application Data

(60) Provisional application No. 62/851,162, filed on May 22, 2019.

(51) Int. Cl.
*H01M 4/04* (2006.01)
*H01M 10/04* (2006.01)
(Continued)

(52) U.S. Cl.
CPC .............. *H01M 4/04* (2013.01); *H01M 4/75* (2013.01); *H01M 10/04* (2013.01);
(Continued)

(58) Field of Classification Search
CPC .... H01M 50/54; H01M 10/0585; H01M 4/75; H01M 4/04; H01M 10/04; H01M 50/534;
(Continued)

(56) References Cited

U.S. PATENT DOCUMENTS 3,564,716 A * 2/1971 Burrows ............ H01R 43/0427
30/360
4,664,991 A 5/1987 Perichaud et al.
(Continued)

FOREIGN PATENT DOCUMENTS

CN 1223477 A 7/1999
CN 1650050 A 8/2005
(Continued)

OTHER PUBLICATIONS

PCT/US2020/033938, Aug. 13, 2020, International Search Report and Written Opinion.
(Continued)

*Primary Examiner* — Matthew T Martin
*Assistant Examiner* — Jessie L. Walls
(74) *Attorney, Agent, or Firm* — Wolf, Greenfield & Sacks, P.C.

(57) ABSTRACT

Methods for electrically coupling electrode portions within electrochemical devices, and associated articles and systems, are generally described. In some cases, an electrically non-conductive layer is between multiple electrode portions that are to be coupled. In some cases, the method comprises penetrating the article to establish electrical coupling between the electrode portions previously separated by the electrically non-conductive layer.

43 Claims, 21 Drawing Sheets

(51) Int. Cl.
*H01M 10/0585* (2010.01)
*H01M 4/75* (2006.01)
*H01M 50/534* (2021.01)
*H01M 50/562* (2021.01)

(52) U.S. Cl.
CPC ...... *H01M 10/0585* (2013.01); *H01M 50/534* (2021.01); *H01M 50/562* (2021.01)

(58) Field of Classification Search
CPC .... H01M 50/562; H01M 10/052; H01M 4/64; H01M 4/0404; H01M 4/02; H01M 4/13
See application file for complete search history.

(56) References Cited

U.S. PATENT DOCUMENTS

| | | | |
|---|---|---|---|
| 4,739,018 A | 4/1988 | Armand et al. | |
| 4,833,048 A | 5/1989 | Dejonghe et al. | |
| 4,917,974 A | 4/1990 | De Jonghe et al. | |
| 5,162,175 A | 11/1992 | Visco et al. | |
| 5,194,341 A | 3/1993 | Bagley et al. | |
| 5,324,599 A | 6/1994 | Oyama et al. | |
| 5,441,831 A | 8/1995 | Okamoto et al. | |
| 5,516,598 A | 5/1996 | Visco et al. | |
| 5,529,860 A | 6/1996 | Skotheim et al. | |
| 5,601,947 A | 2/1997 | Skotheim et al. | |
| 5,648,187 A | 7/1997 | Skotheim | |
| 5,690,702 A | 11/1997 | Skotheim et al. | |
| 5,723,230 A | 3/1998 | Naoi et al. | |
| 5,783,330 A | 7/1998 | Naoi et al. | |
| 5,792,575 A | 8/1998 | Naoi et al. | |
| 5,882,819 A | 3/1999 | Naoi et al. | |
| 5,919,587 A | 7/1999 | Mukherjee et al. | |
| 5,961,672 A | 10/1999 | Skotheim et al. | |
| 6,117,590 A | 9/2000 | Skotheim et al. | |
| 6,153,337 A | 11/2000 | Carlson et al. | |
| 6,201,100 B1 | 3/2001 | Gorkovenko et al. | |
| 6,238,821 B1 | 5/2001 | Mukherjee et al. | |
| 6,306,545 B1 | 10/2001 | Carlson et al. | |
| 6,733,924 B1 | 5/2004 | Skotheim et al. | |
| 6,797,428 B1 | 9/2004 | Skotheim et al. | |
| 6,921,469 B2 | 7/2005 | Larsen | |
| 6,936,381 B2 | 8/2005 | Skotheim et al. | |
| 7,247,408 B2 | 7/2007 | Skotheim et al. | |
| 7,688,075 B2 | 3/2010 | Kelley et al. | |
| 7,771,870 B2 | 8/2010 | Affinito et al. | |
| 7,785,730 B2 | 8/2010 | Affinito et al. | |
| 7,939,198 B2 | 5/2011 | Mukherjee et al. | |
| 8,076,024 B2 | 12/2011 | Affinito et al. | |
| 8,084,102 B2 | 12/2011 | Affinito | |
| 8,087,309 B2 | 1/2012 | Kelley et al. | |
| 8,105,717 B2 | 1/2012 | Skotheim et al. | |
| 8,197,971 B2 | 6/2012 | Skotheim et al. | |
| 8,264,205 B2 | 9/2012 | Kopera | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,617,748 B2 | 12/2013 | Mikhaylik et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 8,871,387 B2 | 10/2014 | Wang et al. | |
| 8,936,870 B2 | 1/2015 | Affinito et al. | |
| 8,968,928 B2 | 3/2015 | Wang et al. | |
| 9,005,311 B2 | 4/2015 | Safont-Sempere et al. | |
| 9,005,809 B2 | 4/2015 | Wilkening et al. | |
| 9,034,421 B2 | 5/2015 | Mikhaylik et al. | |
| 9,040,197 B2 | 5/2015 | Affinito et al. | |
| 9,040,201 B2 | 5/2015 | Affinito et al. | |
| 9,065,149 B2 | 6/2015 | Skotheim et al. | |
| 9,077,041 B2 | 7/2015 | Burnside et al. | |
| 9,105,938 B2 | 8/2015 | Scordilis-Kelley et al. | |
| 9,214,678 B2 | 12/2015 | Mikhaylik | |
| 9,350,009 B1* | 5/2016 | Lim | H01M 50/54 |
| 9,397,342 B2 | 7/2016 | Skotheim et al. | |
| 9,419,274 B2 | 8/2016 | Wilkening et al. | |
| 9,490,478 B2 | 11/2016 | Mikhaylik et al. | |
| 9,531,009 B2 | 12/2016 | Kumaresan et al. | |
| 9,548,492 B2 | 1/2017 | Affinito et al. | |
| 9,559,348 B2 | 1/2017 | Kumaresan et al. | |
| 9,577,243 B2 | 2/2017 | Schmidt et al. | |
| 9,577,267 B2 | 2/2017 | Scordilis-Kelley et al. | |
| 9,653,735 B2 | 5/2017 | Skotheim et al. | |
| 9,653,750 B2 | 5/2017 | Laramie et al. | |
| 9,711,784 B2 | 7/2017 | Kelley et al. | |
| 9,728,768 B2 | 8/2017 | Mikhaylik et al. | |
| 9,735,411 B2 | 8/2017 | Viner et al. | |
| 9,755,268 B2 | 9/2017 | Fleischmann et al. | |
| 9,780,404 B2 | 10/2017 | Scordilis-Kelley et al. | |
| 9,825,328 B2 | 11/2017 | Du et al. | |
| 9,853,287 B2 | 12/2017 | Mikhaylik et al. | |
| 9,947,963 B2 | 4/2018 | Du et al. | |
| 9,994,959 B2 | 6/2018 | Laramie et al. | |
| 9,994,960 B2 | 6/2018 | Laramie et al. | |
| 10,020,479 B2 | 7/2018 | Mikhaylik et al. | |
| 10,020,512 B2 | 7/2018 | Gronwald et al. | |
| 10,050,308 B2 | 8/2018 | Liao et al. | |
| 10,069,135 B2 | 9/2018 | Fleischmann et al. | |
| 10,069,146 B2 | 9/2018 | Skotheim et al. | |
| 10,122,043 B2 | 11/2018 | Du et al. | |
| 10,243,202 B2 | 3/2019 | Fleischmann et al. | |
| 10,312,545 B2 | 6/2019 | Scordilis-Kelley et al. | |
| 10,319,988 B2 | 6/2019 | Kelley et al. | |
| 10,320,027 B2 | 6/2019 | Scordilis-Kelley et al. | |
| 10,320,031 B2 | 6/2019 | Mikhaylik et al. | |
| 10,333,134 B2 | 6/2019 | Mikhaylik et al. | |
| 10,333,149 B2 | 6/2019 | Affinito et al. | |
| 10,388,987 B2 | 8/2019 | Du et al. | |
| 10,461,333 B2 | 10/2019 | Mikhaylik et al. | |
| 10,461,372 B2 | 10/2019 | Laramie et al. | |
| 10,490,796 B2 | 11/2019 | Laramie et al. | |
| 10,535,902 B2 | 1/2020 | Laramie et al. | |
| 10,541,448 B2 | 1/2020 | Mikhaylik et al. | |
| 10,553,893 B2 | 2/2020 | Laramie et al. | |
| 10,573,869 B2 | 2/2020 | Mikhaylik et al. | |
| 10,608,278 B2 | 3/2020 | Liao et al. | |
| 10,629,947 B2 | 4/2020 | Affinito et al. | |
| 10,629,954 B2 | 4/2020 | Mikhaylik et al. | |
| 10,720,648 B2 | 7/2020 | Quero-Mieres et al. | |
| 2001/0038935 A1 | 11/2001 | Yoshimoto et al. | |
| 2001/0038938 A1* | 11/2001 | Takahashi | H01M 50/574 429/185 |
| 2005/0196672 A1 | 9/2005 | Mukherjee et al. | |
| 2006/0115579 A1 | 6/2006 | Mukherjee et al. | |
| 2007/0221264 A1 | 9/2007 | Shutoh et al. | |
| 2007/0221265 A1 | 9/2007 | Affinito et al. | |
| 2008/0318128 A1 | 12/2008 | Simoneau et al. | |
| 2009/0035646 A1 | 2/2009 | Mikhaylik et al. | |
| 2009/0055110 A1 | 2/2009 | Kelley et al. | |
| 2009/0181298 A1 | 7/2009 | Farrell et al. | |
| 2010/0239914 A1 | 9/2010 | Mikhaylik et al. | |
| 2010/0327811 A1 | 12/2010 | Affinito et al. | |
| 2011/0006738 A1 | 1/2011 | Mikhaylik et al. | |
| 2011/0014524 A1 | 1/2011 | Skotheim et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0165471 A9 | 7/2011 | Skotheim et al. | |
| 2011/0177398 A1 | 7/2011 | Affinito et al. | |
| 2011/0206992 A1 | 8/2011 | Campbell et al. | |
| 2011/0256450 A1 | 10/2011 | Campbell et al. | |
| 2012/0048729 A1 | 3/2012 | Mikhaylik et al. | |
| 2012/0052339 A1 | 3/2012 | Mikhaylik et al. | |
| 2012/0070746 A1 | 3/2012 | Mikhaylik et al. | |
| 2012/0082872 A1 | 4/2012 | Schmidt et al. | |
| 2012/0082901 A1 | 4/2012 | Schmidt et al. | |
| 2013/0177788 A1 | 7/2013 | Hasegawa et al. | |
| 2013/0316072 A1 | 11/2013 | Scordilis-Kelley et al. | |
| 2014/0272565 A1 | 9/2014 | Gronwald et al. | |
| 2014/0272594 A1 | 9/2014 | Safont-Sempere et al. | |
| 2014/0272595 A1 | 9/2014 | Cristadoro et al. | |
| 2014/0272597 A1 | 9/2014 | Mikhaylik et al. | |

(56) References Cited

U.S. PATENT DOCUMENTS

| | | |
|---|---|---|
| 2015/0010804 A1 | 1/2015 | Laramie et al. |
| 2015/0044517 A1 | 2/2015 | Mikhaylik et al. |
| 2015/0162586 A1 | 6/2015 | Fleischmann et al. |
| 2015/0188194 A1 | 7/2015 | Mikhaylik et al. |
| 2015/0236322 A1 | 8/2015 | Laramie et al. |
| 2015/0287986 A1 | 10/2015 | Affinito et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2017/0141385 A1 | 5/2017 | Scordilis-Kelley et al. |
| 2017/0141402 A1 | 5/2017 | Affinito et al. |
| 2017/0338475 A1 | 11/2017 | Laramie et al. |
| 2018/0006303 A1 | 1/2018 | Mikhaylik et al. |
| 2018/0138542 A1 | 5/2018 | Bunte et al. |
| 2018/0230610 A1 | 8/2018 | Laramie et al. |
| 2018/0254516 A1 | 9/2018 | Han et al. |
| 2018/0261820 A1 | 9/2018 | Liao et al. |
| 2018/0301697 A1 | 10/2018 | Affinito et al. |
| 2018/0337406 A1 | 11/2018 | Mudalige et al. |
| 2018/0351148 A1 | 12/2018 | Schneider et al. |
| 2018/0351158 A1 | 12/2018 | Liao et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0267632 A1 | 8/2019 | Affinito et al. |
| 2019/0348672 A1 | 11/2019 | Wang et al. |
| 2019/0386334 A1 | 12/2019 | Scordilis-Kelley et al. |
| 2020/0044460 A1 | 2/2020 | Mikhaylik et al. |
| 2020/0052276 A1* | 2/2020 | Song ............ H01M 4/13 |
| 2020/0091547 A1 | 3/2020 | Scordilis-Kelley et al. |
| 2020/0099108 A1 | 3/2020 | Laramie et al. |
| 2020/0119324 A1 | 4/2020 | Laramie et al. |
| 2020/0185764 A1 | 6/2020 | Liao et al. |
| 2020/0194822 A1 | 6/2020 | Laramie et al. |
| 2020/0220146 A1 | 7/2020 | Laramie et al. |
| 2020/0220149 A1 | 7/2020 | Laramie et al. |
| 2020/0220197 A1 | 7/2020 | Laramie et al. |
| 2020/0220205 A1 | 7/2020 | Affinito et al. |
| 2020/0227785 A1 | 7/2020 | Mikhaylik et al. |

FOREIGN PATENT DOCUMENTS

| | | | |
|---|---|---|---|
| CN | 102576855 A | 7/2012 | |
| CN | 102856578 A | 1/2013 | |
| CN | 105206793 A | 12/2015 | |
| GB | 2333399 A * | 7/1999 | ........ H01M 10/0413 |
| JP | 2013008564 A * | 1/2013 | ........ H01M 10/0585 |
| WO | WO 99/33125 | 7/1999 | |
| WO | WO 99/33130 | 7/1999 | |
| WO | WO 2011/028251 A2 | 3/2011 | |

OTHER PUBLICATIONS

International Search Report and Written Opinion for PCT/US2020/033938 dated Aug. 13, 2020.

Alamgir et al., "Room Temperature Polymer Electrolytes," Lithium Batteries, New Materials, Developments and Perspectives, Chapter 3, pp. 93-136, Elsevier, Amsterdam (1994).

Dominey, "Current State of the Art on Lithium Battery Electrolytes," Lithium Batteries, New Materials, Developments and Perspectives, Chapter 4, pp. 137-165, Elsevier, Amsterdam (1994).

Office Action for CN Application No. 202080045903.5 dated Apr. 7, 2023.

\* cited by examiner

View A

View B

View B

View B

ELECTRICALLY COUPLED ELECTRODES, AND ASSOCIATED ARTICLES AND METHODS

RELATED APPLICATIONS

This application claims priority under 35 U.S.C. § 119(e) to U.S. Provisional Application No. 62/851,162, filed May 22, 2019, and entitled "Electrically Coupled Electrodes, and Associated Articles and Methods," which is incorporated herein by reference in its entirety for all purposes.

TECHNICAL FIELD

Methods for electrically coupling electrode portions within electrochemical devices, and associated articles and systems, are generally described.

BACKGROUND

Electrochemical cells typically include electrodes comprising electrode active materials that participate in an electrochemical reaction to produce electric current. A typical electrochemical device, such as a battery, includes terminals that can be used for electrically coupling the electrodes of the electrochemical device to external circuitry. Certain embodiments of the present disclosure are directed to inventive methods, systems, and articles for coupling electrodes of electrochemical cells.

SUMMARY

Methods for electrically coupling electrode portions within electrochemical devices, and associated articles and systems, are generally described. In some cases, an electrically non-conductive layer is between multiple electrode portions that are to be coupled. In some cases, the method comprises penetrating the article to establish electrical coupling between the electrode portions previously separated by the electrically non-conductive layer. The subject matter of the present invention involves, in some cases, interrelated products, alternative solutions to a particular problem, and/or a plurality of different uses of one or more systems and/or articles.

In one aspect, a method is described. In some embodiments, the method comprises penetrating a portion of an article comprising an electrically non-conductive layer comprising a first side and a second side, a first electrode portion adjacent to the first side of the electrically non-conductive layer, and a second electrode portion adjacent to the second side of the electrically non-conductive layer. In some embodiments, the method is performed such that an electrical coupling between the first electrode portion and the second electrode portion is established.

In another aspect, an article is described. In some embodiments, the article comprises an electrically non-conductive layer comprising a first side and a second side. In some embodiments, the article comprises a first electrode portion adjacent to the first side of the electrically non-conductive layer, with the first electrode portion having a polarity. In some embodiments, the article comprises a second electrode portion adjacent to the second side of the electrically non-conductive layer, with the second electrode portion having a polarity that is the same as the polarity of the first electrode portion. In some embodiments, the first electrode portion is electrically coupled to the second electrode portion by an electrically conductive solid material region extending from the first electrode portion, through the electrically non-conductive layer, and to the second electrode portion.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
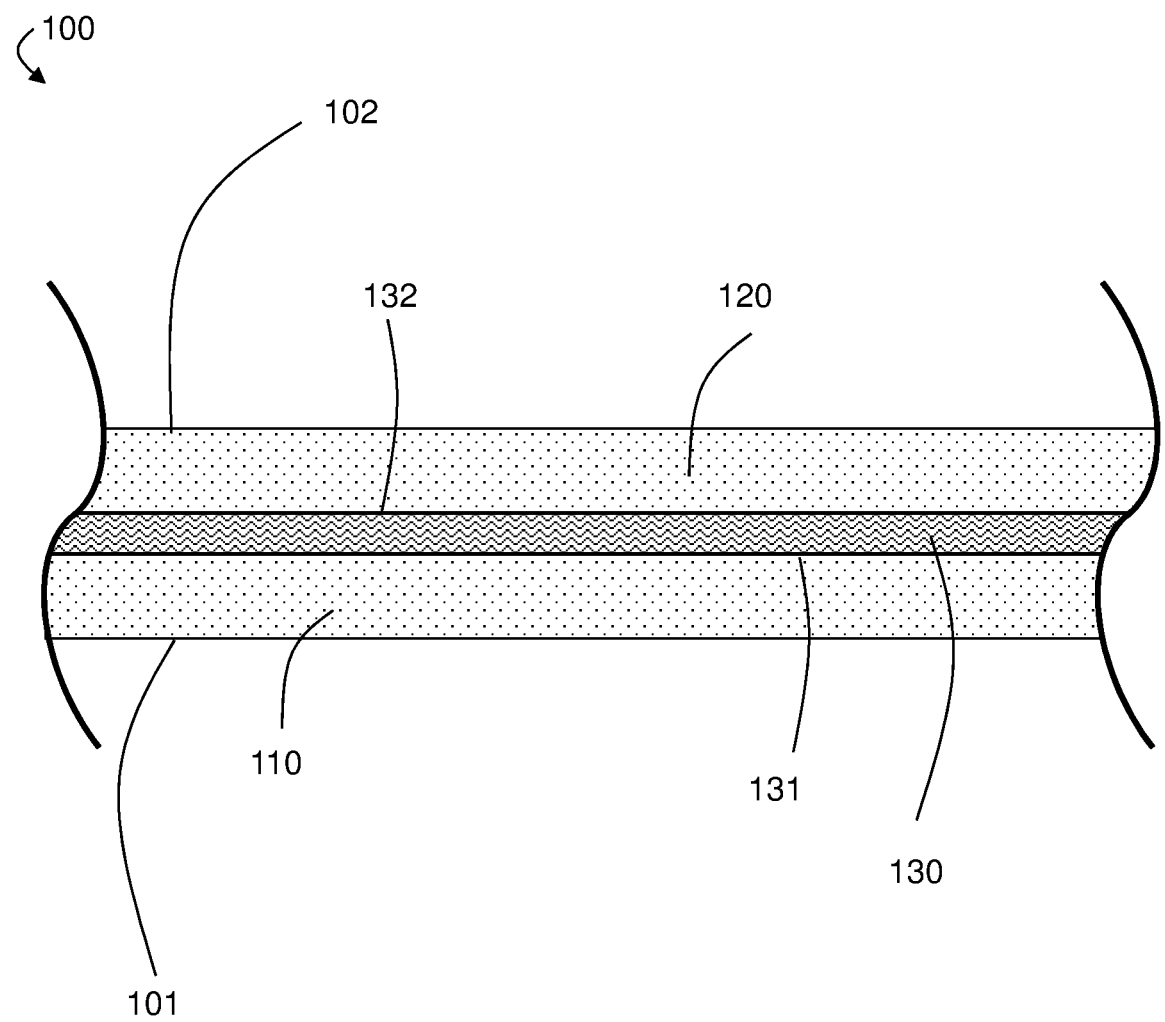
FIG. 1A is an exemplary schematic illustration depicting a cross-sectional view of an article comprising multiple electrode portions, according to certain embodiments.

Methods for electrically coupling electrode portions within electrochemical devices, and associated articles and systems, are generally described. Some methods comprise penetrating an article that is part of an electrochemical device (e.g., battery) in order to electrically couple multiple electrode portions within that article that are separated by one or more electrically non-conductive layers, so that an electrical connection between the multiple electrode portions and an electrically conductive terminal may be achieved. As a non-limiting example, in some cases, an anode terminal of a battery stack is coupled to an extension comprising anode portions (e.g., vapor-deposited lithium layer portions) from that battery stack, and despite electrically non-conductive layers (e.g., release layers) being interposed between those anode portions, the anode portions within the anode extension have good electrical contact with the anode terminal, due at least in part to penetrating at least a portion of the stack. In some cases, the methods comprise penetrating the article by piercing the article with a pin (e.g., crimping the article) such that electrical contact between electrode portions within the article are established. In some cases, an electrically conductive material region (e.g., comprising electrode active material such as lithium or lithium alloy) and/or a cavity extends from certain electrode portions, through electrically non-conductive layers (e.g., release layer(s)), and to other electrode portions to establish the electrical coupling.

Establishing efficient charge transport between electrodes and a terminal of an electrochemical device can be important for the performance of that electrochemical device during cycling. However, some electrode configurations may pose difficulties for transporting charge from portions of the electrodes to the terminal. For example, in some cases, when electrically non-conductive layers separate electrode portions, transporting charge from one electrode portion to another electrode portion may be difficult due to a lack of a facile conductive pathway, thereby creating high resistances between the terminal of the electrochemical device and the electrodes (e.g., anodes). As one non-limiting example, some electrochemical devices may employ stacks of "sandwich"-type double-sided electrodes such as anodes comprising two vapor-deposited lithium layers separated by a release layer. The presence of the release layer can limit the ability for current to flow from one anode to the other anode in the sandwich electrode and make it difficult to collect current from any anodes not in direct contact with the terminal. While one could attempt to remove the electrically non-conductive layers of the electrodes, such a process can be difficult and expensive. Simple, inexpensive processes for establishing electrical communication between electrodes separated by electrically non-conductive layers would be desirable. The methods described herein, in some cases, provide for such processes. Unexpectedly, it has been found that penetrating the article comprising the electrode portions and electrically non-conductive layer(s) (e.g., by piercing the articles with a pin) can establish electrical coupling between electrode portions, even when separated by electrically non-conductive layers. In some cases, the step of penetrating the article causes the formation of electrically conductive solid material regions that extend from a first electrode portion, through an electrically non-conductive layer, and to another electrode portion (e.g., having the same polarity as the first electrode portion), thereby establishing the electrical coupling. In some cases, the object used to penetrate the article can be configured to provide for efficient electrical connections between layers (e.g., via the use of pin geometries/shapes having high perimeter to cross-sectional area ratios). The methods and articles described herein may, in some but not necessarily all cases, avoid the need for removing electrically non-conductive layers, thereby increasing manufacturing efficiency and lowering costs while still maintaining suitable performance of the electrochemical device.

In one aspect, methods related to establishing electrical coupling between two or more electrode portions within certain articles are generally described.

In some embodiments, the method comprises penetrating a portion of an article. FIG. 1A is a cross-sectional schematic illustration of exemplary article 100. In some embodiments, upon penetration, electrical coupling between two or more components of the article can be established. As mentioned above, in certain embodiments, the article that is penetrated is part of an electrochemical device (e.g., a battery). For example, in certain embodiments, article 100 is part of an electrochemical device (e.g., a terminal of an electrochemical device where electrical current passing through the electrochemical device is directed to an external electrical component (e.g., during cycling of a battery)).

In some embodiments, the article that is penetrated comprises a first electrode portion and a second electrode portion separated by an electrically non-conductive layer. For example, FIG. 1A depicts article 100 comprising electrically non-conductive layer 130 between first electrode portion 110 and second electrode portion 120. Electrically non-conductive layer 130 comprises first side 131 and second side 132. In accordance with certain embodiments, first electrode portion 110 is adjacent to first side 131, and second electrode portion 120 is adjacent to second side 132. In some cases, each of the two or more electrode portions (e.g., first electrode portion 110 and second electrode portion 120) of the article have the same polarity (e.g., both the first and second electrode portions are anode portions, or both the first and second electrode portions are cathode portions). In some cases in which the article is part of an electrochemical device, it may be desirable to collect electrical current from the two or more electrode portions (e.g., first electrode portion 110 and second electrode portion 120) from a common electrical component (e.g., a terminal of a battery). In certain such cases, the two or more electrode portions are electrically coupled such that electrical current can flow between the common electrical component and the two or more electrode portions with a lower resistance relative to cases in which the two or more electrode portions are not coupled.

In certain embodiments, penetrating a portion of the article is performed such that an electrical coupling between the first electrode portion and the second electrode portion is established. Establishing electrical coupling between the first electrode portion and the second electrode portion by penetrating the article may, in certain cases, provide for a simple, inexpensive process for electrically coupling electrode portions (e.g., in a battery terminal) that are otherwise separated by an electrically non-conductive layer, without the use of complex, expensive fabrication processes. Non-limiting examples of ways in which penetrating the article can establish electrical coupling between the first electrode portion and the second electrode portion are described in more detail below.

Figure 1B:
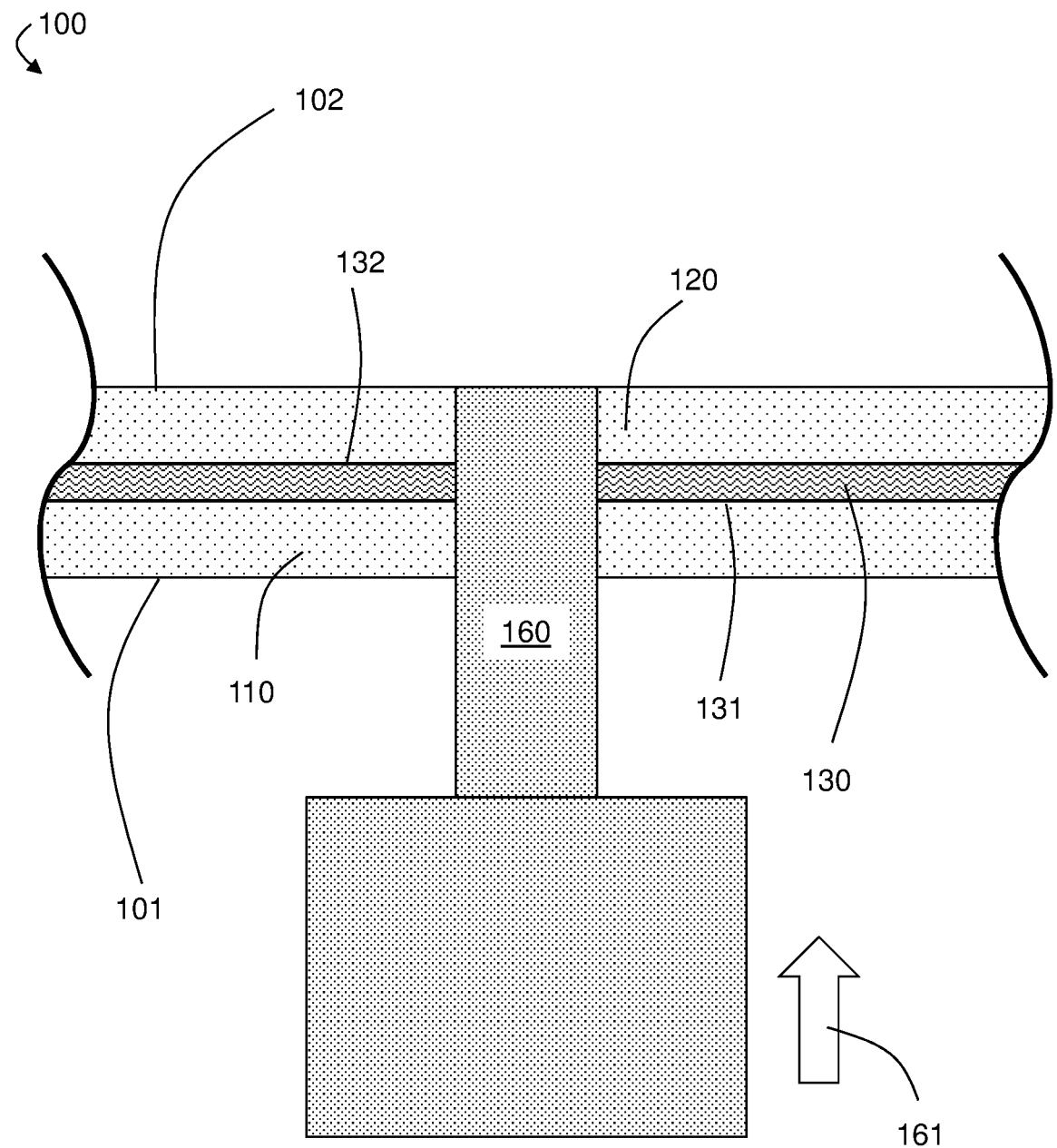
FIG. 1B is an exemplary schematic illustration depicting a cross-sectional view of the article of FIG. 1A being penetrated, according to certain embodiments.

In some embodiments, the step of penetrating the article comprises piercing the article with a solid object. The solid object may be chosen from any of a variety of suitable objects capable of piercing the article. Exemplary solid objects that can be used to penetrate the article include, but are not limited to, a pin, a punch, a rivet, a fastener (e.g., a threaded fastener), a blade, teeth, a needle, and combinations thereof. As a non-limiting example, FIG. 1B depicts a cross-sectional schematic illustration of article 100 that has been pierced by pin 160, in accordance with certain embodiments. In FIG. 1B, pin 160 penetrates article 100 by piercing first side 101 of article 100 and traveling through first electrode portion 110, first side 131 of electrically non-conductive layer 130, second side 132 of electrically non-conductive layer 130, and at least a portion of second electrode portion 120, according to certain embodiments.

In some embodiments, penetrating the article (e.g., with a solid object such as a pin) comprises driving the solid object partially through the article. While FIG. 1B is illustrated to show pin 160 having penetrated through first side 101 of article 100 and reaching all the way to second side 102, it should be understood that in some cases, pin 160 may penetrate article 100 by piercing first side 101, first electrode portion 110, electrically non-conductive layer 130, and second electrode portion 120, but without reaching all the way to second side 102. Penetrating the article such that the solid object does not travel completely through the article may be beneficial in certain, but not necessarily all cases, as it may avoid the formation of certain undesirable features on the second side of the article. For example, in some cases, penetrating through the entire article may cause the formation of burrs, which may be undesirable in certain applications, such as in certain types of batteries.

The solid object used to penetrate the article (e.g., by piercing) may have any of a variety of suitable configurations for performing the penetration step described herein. For example, the solid object (e.g., pin 160) may comprise a solid material and have dimensions (e.g., aspect ratio) suitable for piercing the article without damaging the article (e.g., without causing the article to be no longer suitable for its intended purpose, such as being a part of an electrochemical device). In certain embodiments, penetrating the article comprises orienting the solid object (e.g., pin) with respect to the article and driving the solid object into the article by applying a directional force to the solid object. Referring again to FIG. 1B, penetrating article 100 may comprise applying a force to pin 160 in the direction indicated by arrow 161 such that pin 160 pierces article 100. In some cases, penetrating the article comprises using other forces in addition to the directional force for causing the solid object to penetrate the article. For example, in some cases, a rotational force accompanies the directional force. As another example, in some cases, vibration accompanies the directional force as the solid object penetrates the article.

In some embodiments, methods described herein comprise removing the solid object. For example, in cases in which pin 160 has penetrated exemplary article 100 (e.g., to establish electrical coupling between first electrode portion 110 and second electrode portion 120), pin 160 may subsequently be removed from article 100, in accordance with certain embodiments. In some embodiments, a solid object (e.g., pin) is used to penetrate an article using a spring-loaded mechanism, and the spring loaded mechanism is used to then retract the solid object from the article following the penetration step. In some cases, a scraper is used during the removing of the solid object. The use of such a scraper may aid in removing the solid object from the article (and, optionally, from an electrically conductive terminal coupled to the article), especially in certain cases in which the solid object becomes adhered to components of the article and/or electrically conductive terminal. The electrical coupling between the first electrode portion and the second electrode portion established during the penetration step may remain, even after the solid object (e.g., pin) used to penetrate the article is removed from the article. In such a way, the electrochemical device may be cycled following the removal of the solid object, in accordance with certain embodiments.

In some embodiments, penetrating the article causes the formation of an electrically conductive solid material region within the article. For example, referring to FIG. 2, the step of penetrating article 100 may cause the formation of electrically conductive solid material region 140 within article 100. In certain cases, the electrically conductive solid material region extends from the first electrode portion, through the electrically non-conductive layer, and to the second electrode portion.

It should be understood that when a region (e.g., an electrically conductive solid material region) extends to a component of the article (e.g., the second electrode portion), the region may extend past the component (e.g., passing through the component and extending to yet another region of the article distal to the component), or the region may terminate at the component to which it extends. For example, referring again to FIG. 2, electrically conductive solid material region 140 extends from first electrode portion 110, through electrically non-conductive layer 130, and to second electrode portion 120. In certain embodiments, electrically conductive solid material region 140 stops where shown in FIG. 2, while in certain other embodiments, electrically conductive solid material region 140 extends past second electrode portion 120 to yet another region of article 100 not shown.

In some embodiments, the electrically conductive solid material region electrically couples the first electrode portion and the second electrode portion. For example, referring again to FIG. 2, electrically conductive solid material region 140 electrically couples first electrode portion 110 and second electrode portion 120. In other words, electrical current may flow from the first electrode portion, through the electrically conductive solid material region, and to the second electrode portion. In certain cases, the presence of the electrically conductive solid material region allows for the flow of current from one electrode portion (e.g., the first electrode portion) to another electrode portion (e.g., the second electrode portion), where that flow of current would otherwise not be possible due to, for example, the positioning of the electrically non-conductive layer between the two electrode portions. In certain cases, the presence of the electrically conductive solid material region allows for the flow of current from one electrode portion to another electrode portion with a lower resistance than would otherwise be present in the absence of the electrically conductive solid material region. In such a way, establishing electrical coupling between the first electrode portion and the second electrode portion (e.g., via a solid electrically conductive material region) may improve the performance of an electrochemical device comprising the article. For example, in cases in which the article is part of a battery terminal, reducing the resistance between the first electrode portion and the second electrode portion may allow current to be collected from or injected into the battery more efficiently (e.g., during cycling of the battery).

The electrically conductive solid material may comprise any suitable electrically conductive material. In some cases, the electrically conductive solid material is or comprises a metal, a metal alloy, and/or an electrically conductive composite material. As described in more detail below, in certain cases, the electrically conductive solid material of the electrically conductive solid material region comprises a material that the first electrode portion and the second electrode portion also comprise, such as an electrode active material.

Figure 3:
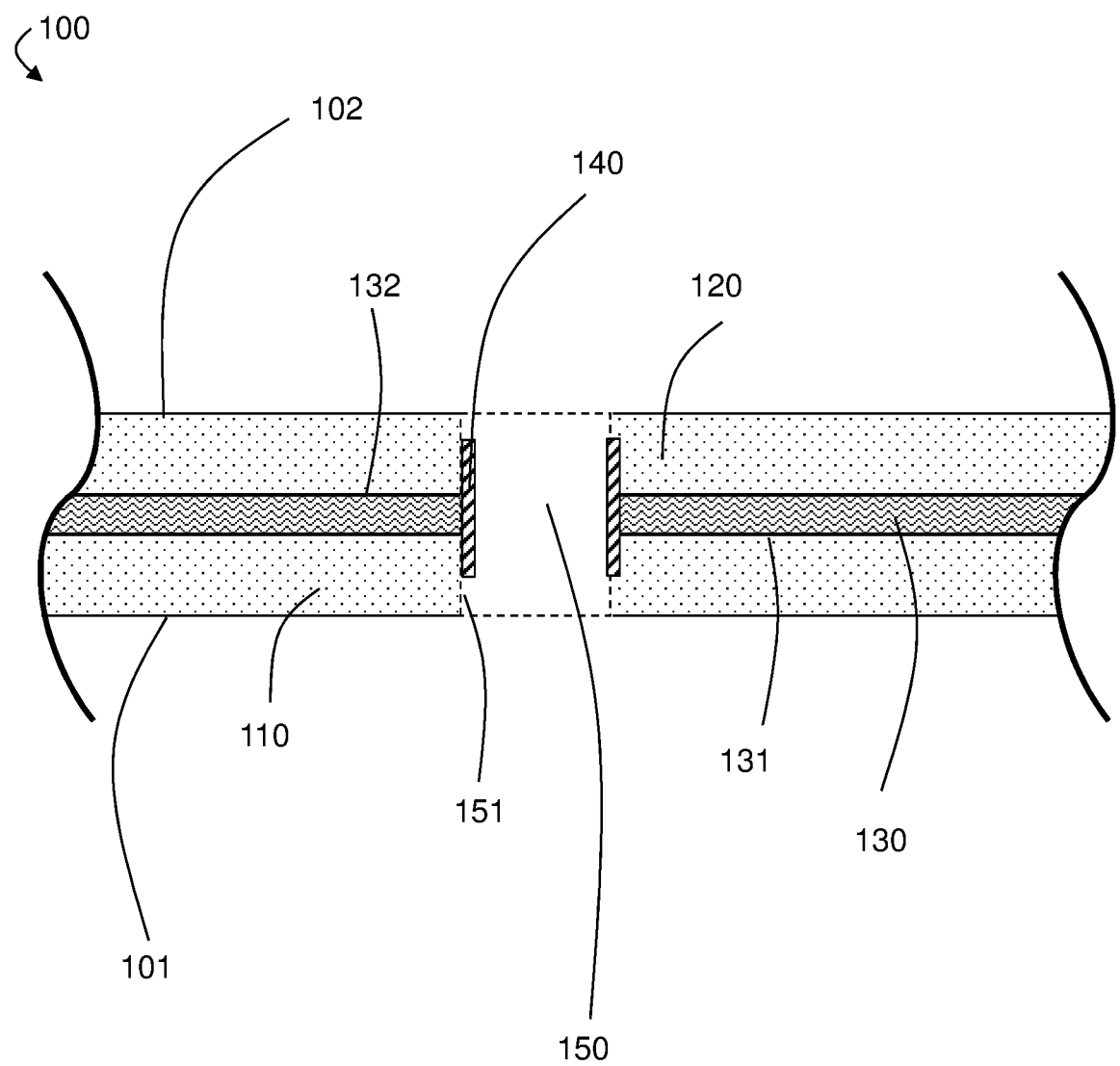
FIG. 3 is an exemplary schematic illustration depicting a cross-sectional view of an article comprising multiple electrode portions containing a cavity, according to certain embodiments.

In some embodiments, penetrating the article causes the formation of a cavity in the article. For example, piercing the article with a solid object (e.g., pin) such that the solid object penetrates through the article, and then removing the solid object, may result in the presence of a cavity in the article in the space where the solid object had traveled. In some embodiments, the cavity extends from the first electrode portion, through the electrically non-conductive layer, and to the second electrode portion. Referring to FIG. 3, article 100 comprises cavity 150 extending from first electrode portion 110, through electrically nonconductive layer 130, and to second electrode portion 120. Certain methods described herein comprise penetrating article 100 by piercing article 100 with pin 160 to establish electrical coupling between first electrode portion 110 and second electrode portion 120, and removing pin 160, thereby resulting in article 100 comprising cavity 150. One non-limiting embodiment comprises crimping the article, wherein the crimping results in electrical coupling between the first electrode portion and the second electrode portion of the article (e.g., such that the article can be used for coupling to a terminal of an electrochemical device with improved performance).

In some embodiments, the first electrode portion comprises an electrode active material and the second electrode portion comprises the same electrode active material. For example, in some embodiments, first electrode portion 110 and second electrode portion 120 each comprise the same electrode active material. As used herein, the term "electrode active material" refers to any electrochemically active species associated with an electrode. For example, a "cathode active material" refers to any electrochemically active species associated with the cathode, while an "anode active material" refers to any electrochemically active species associated with an anode. In some embodiments, the first electrode portion and the second electrode portion comprise lithium and/or a lithium metal alloy as an electrode active material. The first electrode portion and the second electrode portion can comprise, in accordance with certain embodiments, lithium metal and/or a lithium metal alloy as an electrode active material during at least a portion of or during all of a charging and/or discharging process of an electrochemical cell. The lithium and/or lithium metal alloy can be, for example, an anode active material. Suitable cathode active materials and anode active materials are described more fully below.

In some embodiments, the electrically conductive solid material region also comprises the electrode active material present in the first electrode portion and the second electrode portion. For example, referring again to FIG. 2, in some cases, first electrode portion 110 comprises an anode active material (e.g., lithium or a lithium alloy), second electrode portion 120 comprises the same anode active material, and electrically conductive solid material region 140 extending from first electrode portion 110, through electrically non-conductive layer 130, and to second electrode portion 120 comprises the same anode active material as first electrode portion 110 and second electrode portion 120. It has been observed that the step of penetrating the article can cause a portion of the electrode active material of the first electrode portion and/or the second electrode portion to migrate such that that portion of the electrode active material forms at least a part of an electrically conductive solid material region that extends from the first electrode portion, through the electrically non-conductive layer, and to the second electrode portion, thereby electrically coupling the first electrode portion and the second electrode portion. As one non-limiting example, first electrode portion 110 and second electrode portion 120 can each comprise lithium and/or lithium alloy as an electrode active material, and penetrating article 100 (e.g., with pin 160) can cause a portion of the lithium and/or lithium alloy of first electrode portion 110 and/or second electrode portion 120 to migrate across a pierced portion of electrically non-conductive layer 130 such that an electrically conductive solid material region comprising lithium and/or lithium alloy electrically couples first electrode portion 110 and second electrode portion 120.

In some embodiments, at least a portion of the electrically conductive solid material is positioned along a wall of the cavity. The walls of the cavity occupy the interface between the cavity and the solid portions of the article surrounding the cavity. Referring again to FIG. 3, cavity 150 of article 100 (formed, e.g., by penetrating article 100) comprises wall 151, in accordance with certain embodiments. Wall 151 is formed along the interface of cavity 150 and first electrode portion 110, the interface of cavity 150 and electrically non-conductive layer 130, and the interface of cavity 150 and second electrode portion 120, according to certain embodiments. As shown in FIG. 3, optional electrically conductive solid material region 140 is positioned along wall 151, according to certain embodiments. In some cases, the portion of electrically conductive solid material region positioned along a wall of the cavity is created when the article is penetrated (e.g., by being pierced with a solid object such as a pin) and a portion of electrode active material (e.g., lithium or lithium alloy) from the first electrode portion and/or the second electrode portion migrates along the direction of travel of the penetrating solid object (e.g., the pin), such that when the penetrating object is subsequently removed from the article, the portion of electrode active material remains positioned along the wall of the resulting cavity. In some cases, the portion of electrically conductive solid material along a wall of the cavity extends from the first electrode portion, through the electrically non-conductive layer, and to the second electrode portion, thereby electrically coupling the first electrode portion and the second electrode portion. In some cases, penetrating the article to cause the formation of electrically conductive solid material positioned along the wall of the cavity provides for a facile and relatively inexpensive technique for electrically coupling electrode portions (which may, in turn, be connected to a terminal of an electrochemical device).

Figure 2:
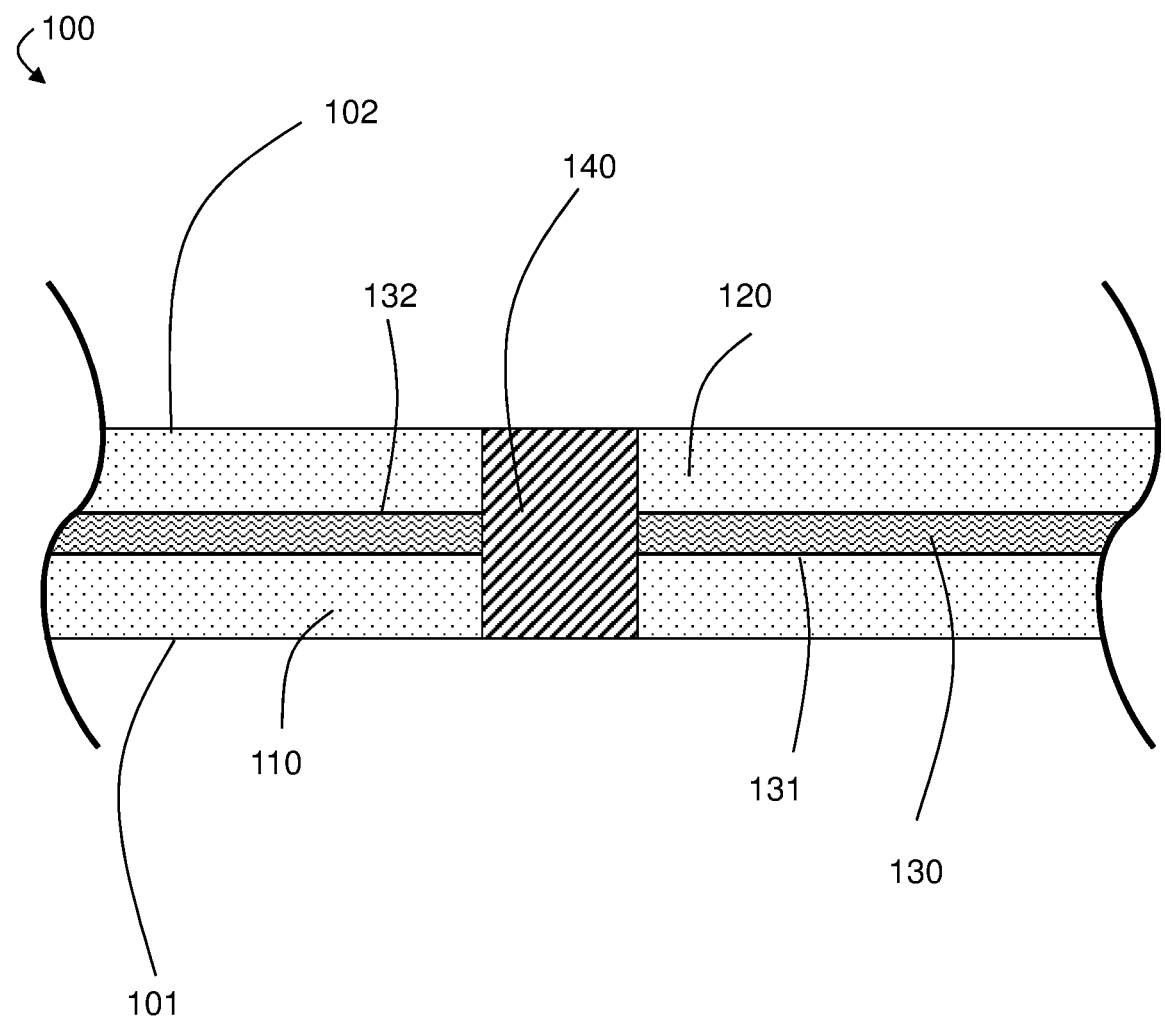
FIG. 2 is an exemplary schematic illustration depicting a cross-sectional view of an article comprising multiple electrode portions, according to certain embodiments.

Certain methods described herein further comprise filling at least a portion of the cavity with an electrically conductive material. Filling at least a portion of the cavity with an electrically conductive material (e.g., following formation of the cavity by penetrating the article) may form a relatively large electrically conductive solid material region extending from the first electrode portion, through the electrically non-conductive layer, and to the second electrode portion. Filling at least a portion of the cavity with an electrically conductive material may also improve (e.g., increase) the area of contact between the first electrode portion, the second electrode portion, and the electrically conductive solid material region, thereby improving the electrical connection between the first electrode portion and the second electrode portion. The presence of such a relatively large electrically conductive solid material may provide for a relatively low-resistance medium through which current can pass from the first electrode portion to the second electrode portion, and vice versa. For example, penetrating article 100 may initially form cavity 150, as shown in FIG. 3, and at least a portion of cavity 150 may be subsequently filled with an electrically conductive solid material (e.g., via coating, deposition, etc.). In some embodiments, filling at least a portion of the cavity involves filling all or substantially all of the cavity, as shown in FIG. 2.

In some embodiments, a relatively large percentage of the volume of the cavity is filled with electrically conductive material. In some embodiments, at least 10 volume percent (10 vol %), at least 25 vol %, at least 50 vol %, at least 75 vol %, at least 90 vol %, at least 95 vol %, at least 99 vol %, or up to 100 vol % of the cavity is filled with electrically conductive material. Combinations of these ranges are possible. For example, in some embodiments, the methods described herein comprise filling the cavity such that at least 10 vol % and up to 100 vol % of the cavity is filled with electrically conductive material.

In some cases, the cavity is filled with an electrically conductive solid material. In some, but not necessarily all cases, the electrically conductive solid material is a material that is different than the electrode active material of the first electrode portion and/or the second electrode portion. The material used to fill the cavity may, in accordance with certain embodiments, comprise a metal, metal alloy, electrically conductive composite materials, electrically conductive polymers, and/or combinations thereof. Exemplary materials that can be used to fill the cavity include, but are not limited to, copper, aluminum, and lithium.

Figure 4A:
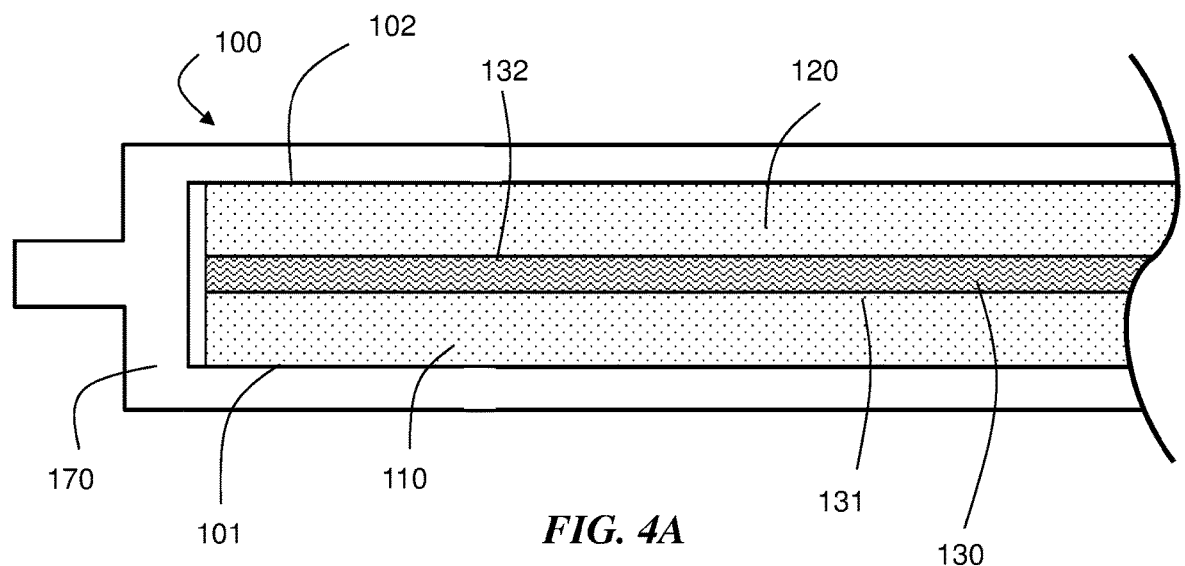
FIG. 4A is an exemplary schematic illustration depicting a cross-sectional view of an article comprising multiple electrode portions and an electrically conductive terminal, according to certain embodiments.
Figure 4B:
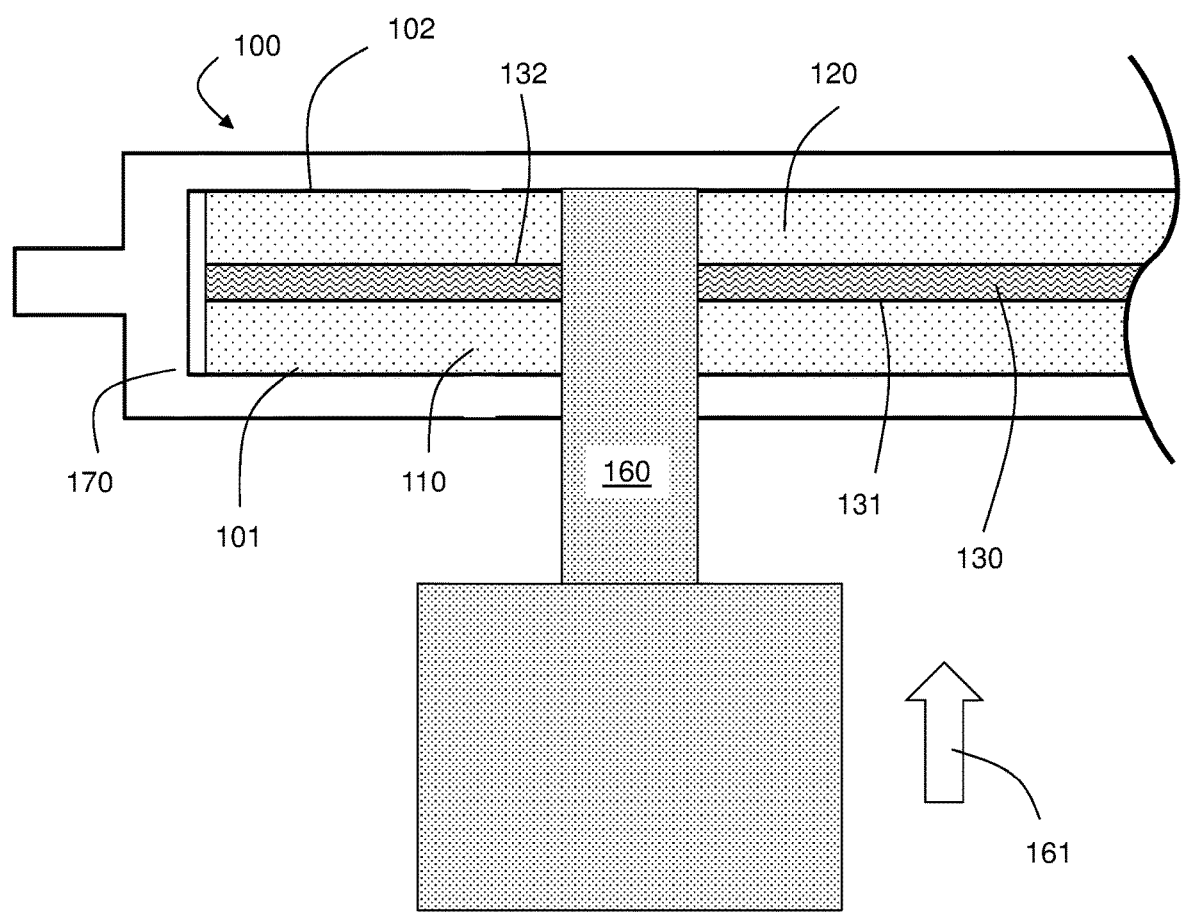
FIG. 4B is an exemplary schematic illustration depicting a cross-sectional view of an article comprising multiple electrode portions and an electrically conductive terminal being penetrated, according to certain embodiments.
Figure 4C:
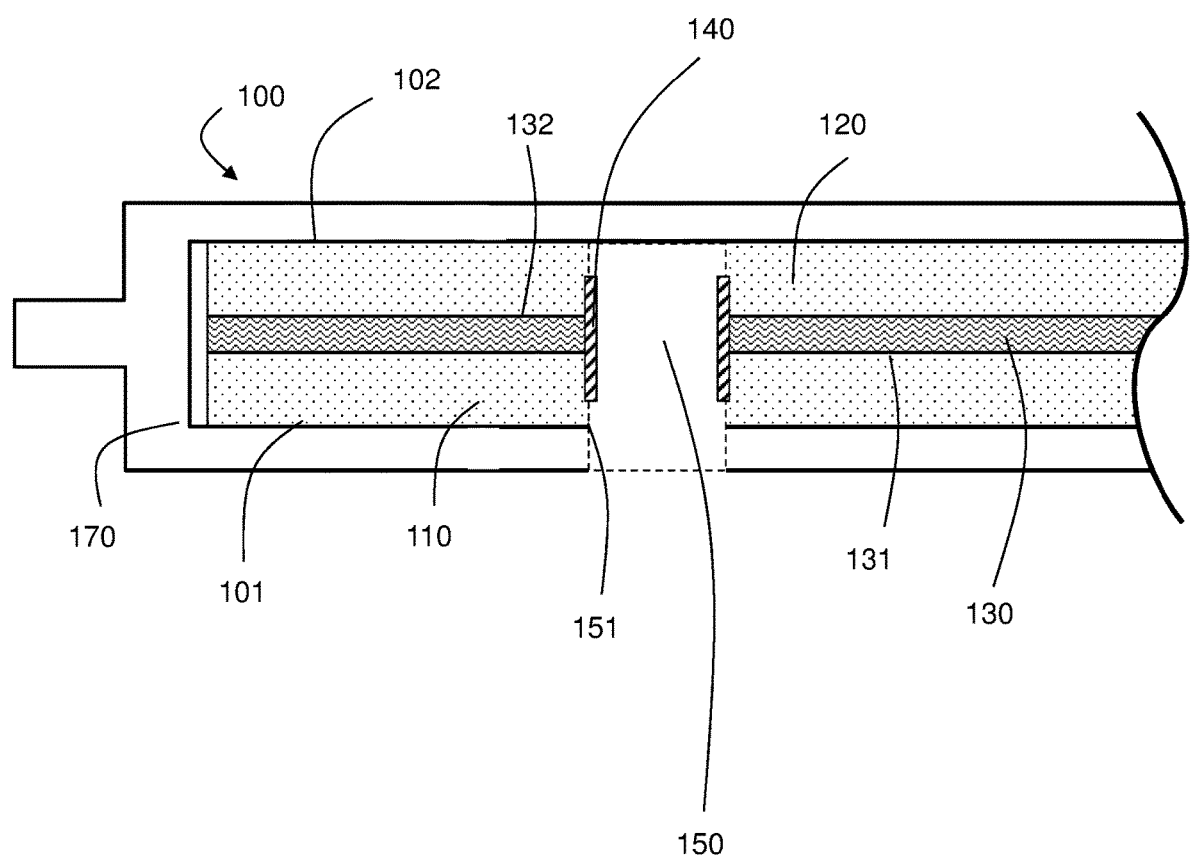
FIG. 4C is an exemplary schematic illustration depicting a cross-sectional view of an article comprising multiple electrode portions and an electrically conductive terminal, according to certain embodiments.
Figure 4D:
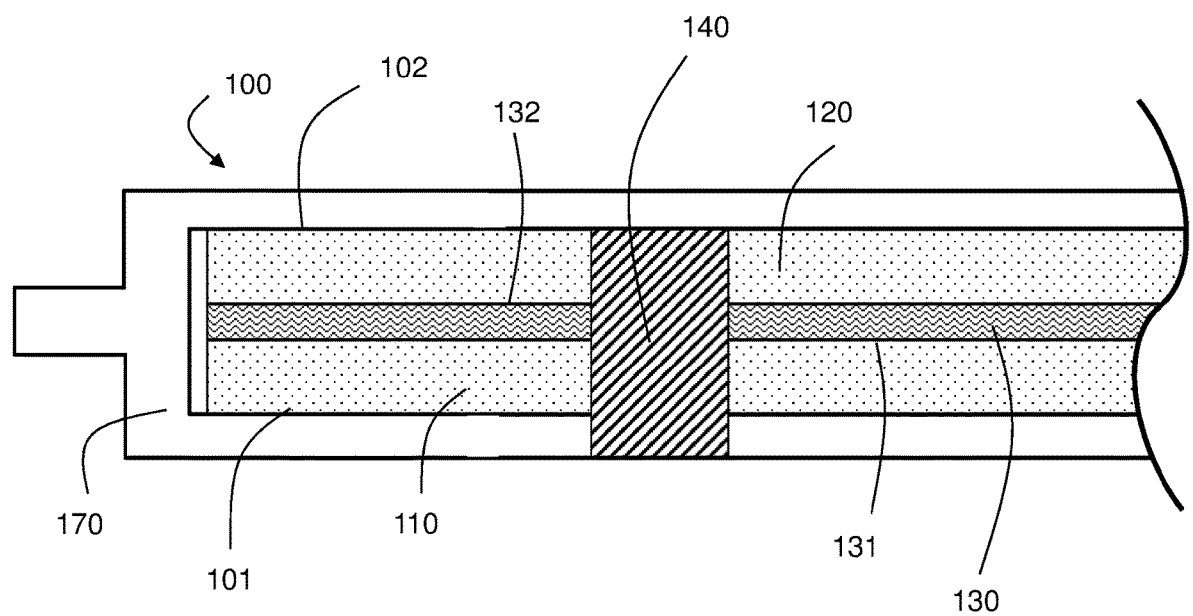
FIG. 4D is an exemplary schematic illustration depicting a cross-sectional view of an article comprising multiple electrode portions and an electrically conductive terminal, according to certain embodiments.

In some embodiments, penetrating the article is performed after the article has been otherwise manufactured and incorporated into an electrochemical cell. For example, in some cases, the article is electrically coupled to an electrically conductive terminal of the electrochemical device, and the step of penetrating the article is performed after the article has been connected to the electrically conductive terminal. Referring to FIG. 4A, article 100 is electrically coupled to electrically conductive terminal 170, in accordance with certain embodiments. In some cases, after article 100 is coupled to electrically conductive terminal 170, the combined article comprising both article 100 and electrically conductive terminal 170 is penetrated according to the methods described herein (e.g., with pin 160), in accordance with certain embodiments. In some such cases, as shown in FIG. 4B, penetrating article 100 may also comprise piercing electrically conductive terminal 170. Some embodiments may comprise removing the object used to penetrate the combined article comprising the article and the electrically conductive terminal, thereby leaving a cavity extending from a portion of the electrically conductive terminal, through the first electrode portion, through the electrically non-conductive layer, and to the second electrode portion. For example, FIG. 4C depicts cavity 150 extending from electrically conductive terminal 170, through first electrode portion 110, through electrically non-conductive layer 130, and to second electrode portion 120, in accordance with certain embodiments. In certain cases, the cavity spanning from the electrically conductive terminal, through the first electrode portion, through the electrically non-conductive layer, and to the second electrode portion is filled with an electrically conductive material (e.g., to improve the electrical coupling of the first electrode portion, the second electrode portion, and the electrically conductive terminal. For example, referring to FIG. 4D, electrically conductive solid material region 140 extends from electrically conductive terminal 170, through first electrode portion 110, through electrically non-conductive layer 130, into second electrode portion 120.

In another aspect, articles are generally described. In some cases, the article, as mentioned above, is a part of an electrochemical cell. In certain cases, the article may be useful for forming an electrical connection between an electrically conductive terminal (e.g., battery terminal) of the electrochemical cell and electrode portions therein. As mentioned above, FIG. 1A depicts a cross-sectional schematic illustration of exemplary article 100.

The articles described herein may comprise a plurality of electrode portions. As described above, the article may comprise a first electrode portion and a second electrode portion. In some cases, an electrically non-conductive layer may be positioned between the first electrode portion and the second electrode portion.

In some embodiments, the electrically non-conductive layer has a first side and a second side. In some embodiments, the article comprises a first electrode portion adjacent to the first side of the electrically non-conductive layer. In certain cases, the article comprises a second electrode portion adjacent to the second side of the electrically non-conductive layer. For example, referring again to FIG. 1A, electrically non-conductive layer 130 comprises first side 131, and article 100 comprises first electrode portion 110 adjacent to first side 131, in accordance with certain embodiments. Similarly, in some cases, article 100 comprises second electrode portion 120 adjacent to second side 132 of electrically non-conductive layer 130.

The first electrode portion and the second electrode portion may be directly on the electrically non-conductive layer (e.g., one or both may be formed via a deposition or coating process). For example, in FIG. 1A, first electrode portion 110 is directly on electrically non-conductive layer 130, and second electrode portion 120 is directly on electrically non-conductive layer 130. Direct contact between the electrode portions and the non-conductive layer is not required, however, and in some embodiments, there are one or more intervening layers (e.g. solid layers) between the electrically non-conductive layer and the adjacent electrode portions. For example, in FIG. 1A, intervening layers could be between first electrode portion 110 and electrically non-conductive layer 130 and/or between second electrode portion 120 and electrically non-conductive layer 130. The first electrode portion adjacent to the first side of the electrically non-conductive layer may be within a relatively small distance of the first side of the electrically non-conductive layer. For example, the first electrode portion may be within 5.0 mm, within 1.0 mm, within 500 micrometers, within 100 micrometers, within 50 micrometers, within 10 micrometers, or less of the electrically non-conductive layer (e.g., the first side of the electrically non-conductive layer). In some embodiments, the first electrode portion is directly adjacent to the first side of the electrically non-conductive layer. Similarly, the second electrode portion adjacent to the second side of the electrically non-conductive layer may be within a relatively small distance of the second side of the electrically non-conductive layer. For example, the second electrode portion may be within 5.0 mm, within 1.0 mm, within 500 micrometers, within 100 micrometers, within 50 micrometers, within 10 micrometers, or less of the second side of the electrically non-conductive layer. In some embodiments, the second electrode portion is directly adjacent to the second side of the electrically non-conductive layer.

As mentioned above, in some cases, the electrically non-conductive layer is or comprises a release layer. Details of exemplary materials and properties of release layers are described in more detail below. The release layer may comprise a polymeric material, and the release layer may be used as part of a fabrication step of one or more components of an article and/or electrochemical device described herein. For example, in some cases, it is convenient to form an electrode portion to be used in an electrochemical device by depositing or coating the electrode material onto a release layer on a substrate (e.g., a substrate used as a solid surface upon which certain components of the article and/or electrochemical device are formed during fabrication, but not necessarily included in the finished article or electrochemical device), and subsequently to use the release layer to separate the deposited or coated electrode portion from the substrate (e.g., so that it can be incorporated into an electrochemical device such as a battery). As one non-limiting example, an anode comprising lithium and/or a lithium alloy as an anode active material may be formed by vapor depositing lithium onto a release layer that is on a substrate, followed by separating the release layer (and a resulting layer of vapor-deposited lithium or lithium alloy) from the substrate. One example of such an anode is described in U.S. Patent Publication No. US 2008/0014501, published on Jan. 17, 2008, filed as application Ser. No. 11/781,915 on Jul. 23, 2007, patented as U.S. Pat. No. 8,753,771 on Jun. 17, 2014, and entitled "Lithium Anodes for Electrochemical Cells", which is incorporated herein by reference in its entirety and for all purposes.

Figure 10A:
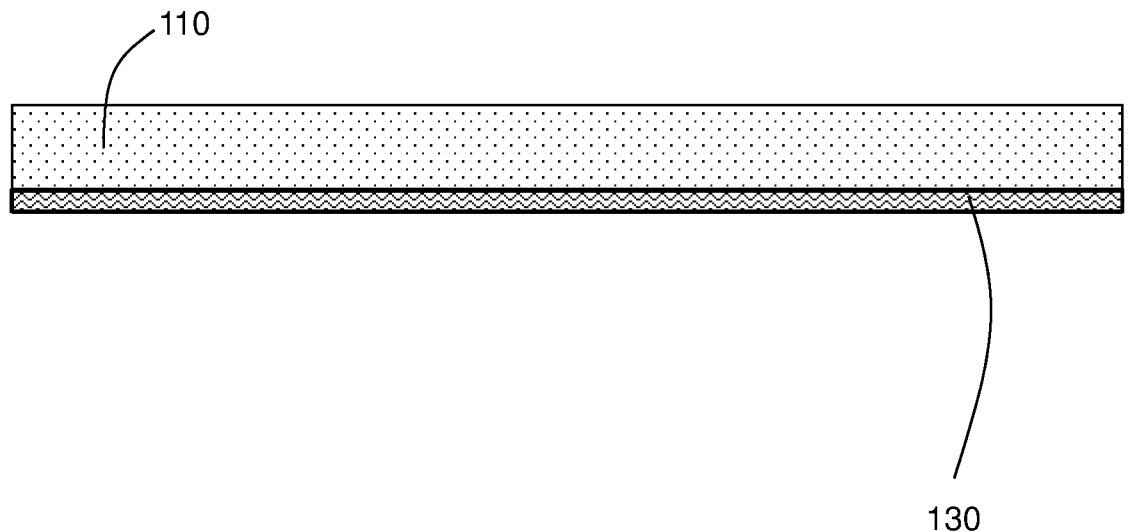
FIG. 10A is an exemplary schematic illustration depicting a cross-sectional view of an electrode portion and an electrically non-conductive layer, according to certain embodiments.
Figure 10B:
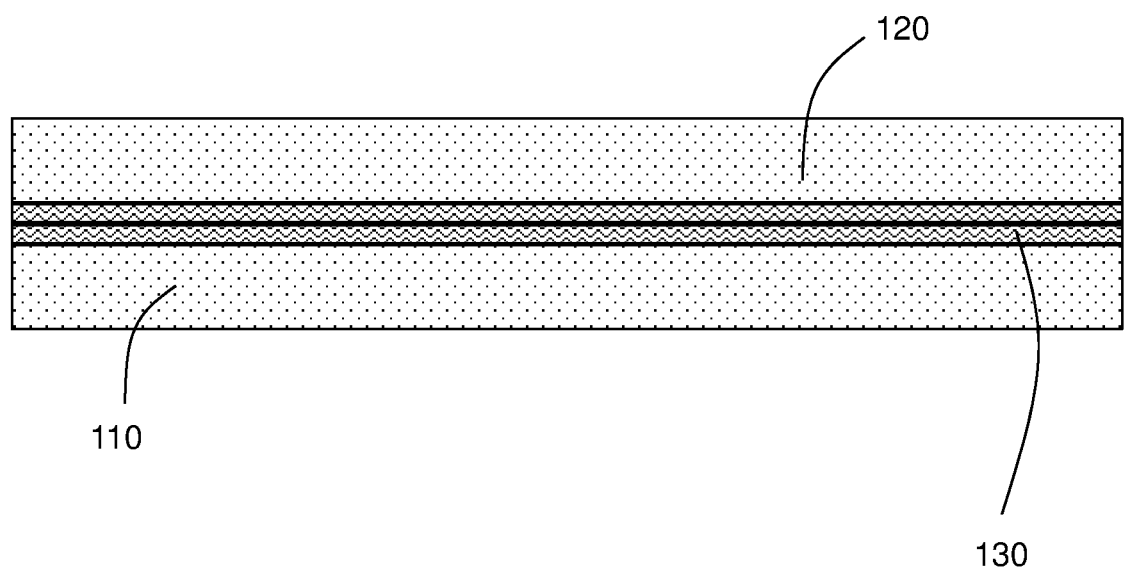
FIG. 10B is an exemplary schematic illustration depicting a cross-sectional view of an article comprising multiple electrode portions, according to certain embodiments.

FIG. 10A is an exemplary illustration of a multilayer structure comprising electrically non-conductive layer 130 (e.g., comprising a release layer) with adjacent electrode portion 110 (e.g. comprising lithium and/or a lithium alloy). In some cases, an electrode for use in an electrochemical device may comprise two multilayer structures combined as shown in FIG. 10B. Such a double-sided electrode portion—comprising an electrically non-conductive layer (which, itself, can comprise two release layers) with a first side and a second side, a first electrode portion adjacent to the first side, and a second electrode portion adjacent to the second side—may provide for a high energy density electrode in electrochemical devices such as batteries. Due to the presence of the electrically non-conductive layer (e.g., release layer) between the first electrode portion and the second electrode portion, methods described herein may be useful for establishing electrical coupling between the first electrode portion and the second electrode portion, which can reduce resistance when collecting current from or injecting current into electrochemical devices comprising such articles (e.g., during discharging and/or charging of an electrochemical device). As mentioned above, methods described herein (e.g., involving penetrating the article) may result in an article in which the first electrode portion is electrically coupled to the second electrode portion by an electrically conductive solid material region extending from the first electrode portion, through the electrically non-conductive layer, and to the second electrode portion.

Methods of establishing electrical coupling between electrode portions described herein may allow for electrically non-conductive layers such as release layers to remain attached to electrode portions when the electrode portions are incorporated into electrochemical cells, while still allowing for relatively efficient charge transport (e.g., current) into and out of the electrodes of the electrochemical cell.

In some embodiments, the electrically non-conductive layer has a relatively low electrical conductivity. For example, in some embodiments, the electrically non-conductive layer has an electrical conductivity of less than or equal to $10^{-12}$ S/cm, less than or equal to $10^{-13}$ S/cm, less than or equal to $10^{-14}$ S/cm, or less. For example, in some cases, the release layer has an electrical conductivity of greater than or equal to $2.5\times10^{-13}$ S/cm and less than or equal to $3\times10^{-13}$ S/cm.

As mentioned above, in some embodiments, the first electrode portion has a polarity. For example, in some cases, the first electrode portion is part of an anode. In some embodiments, the second electrode portion has a polarity that is the same as the polarity of the first electrode portion. For example, in some cases, the second electrode portion is also part of an anode. Referring to FIG. 1A, first electrode portion 110 has a polarity, and second electrode portion 120 has a polarity that is the same as that of first electrode portion 110, in accordance with certain embodiments. In some cases, the first electrode portion and the second electrode portion have the same polarity, and the first electrode portion and the second electrode portion comprise the same electrode active material (e.g., first electrode portion 110 is an anode portion comprising lithium and/or lithium alloy as an anode active material, and second electrode portion 120 is also an anode portion comprising lithium and/or lithium alloy as an anode active material). In some embodiments, the first electrode portion and the second electrode portion are each part of a cathode.

As used herein, "cathode" refers to the electrode in which an electrode active material is oxidized during charging and reduced during discharging, and "anode" refers to the electrode in which an electrode active material is reduced during charging and oxidized during discharging.

As mentioned above, in some embodiments, the electrically non-conductive layer, the first electrode portion, and the second electrode portion form a double-sided electrode portion. For example, article 100 as depicted in FIG. 1A may be a double-sided electrode portion, in accordance with certain embodiments. A double-sided electrode portion, or "sandwich electrode" portion may be part of an electrochemical device (e.g., a battery) having any of a variety of suitable configurations including, but not limited to, a stacked configuration, a folded configuration, or a wound configuration. In some embodiments, the double-sided electrode portion comprises an electrically conductive solid material region extending through at least a part of the double-sided electrode portion. For example, referring to FIG. 2 and as described above, article 100 comprises a double-sided electrode portion, and electrically conductive solid material region 140 extends from first electrode portion 110, through electrically non-conductive layer 130, and to second electrode portion 120, thereby electrically coupling first electrode portion 110 to second electrode portion 120, in accordance with certain embodiments. By electrically coupling electrode portions of the double-sided electrode portion, electrical resistance between the two sides of the double-sided electrode portion may be reduced, thereby improving performance of an electrochemical device comprising the double-sided electrode portion during cycling of the electrochemical device, according to certain embodiments. The portion of the double-sided electrode portion through which an electrically conductive solid material region extends may, in certain embodiments, be a part of a double-sided electrode that is used for forming an electrical connection with an electrically conductive terminal of an electrochemical device, while other portions of the double-sided electrode portion may be used for participating in electrochemical reactions (e.g., during cycling of the electrochemical device).

Figure 5A:
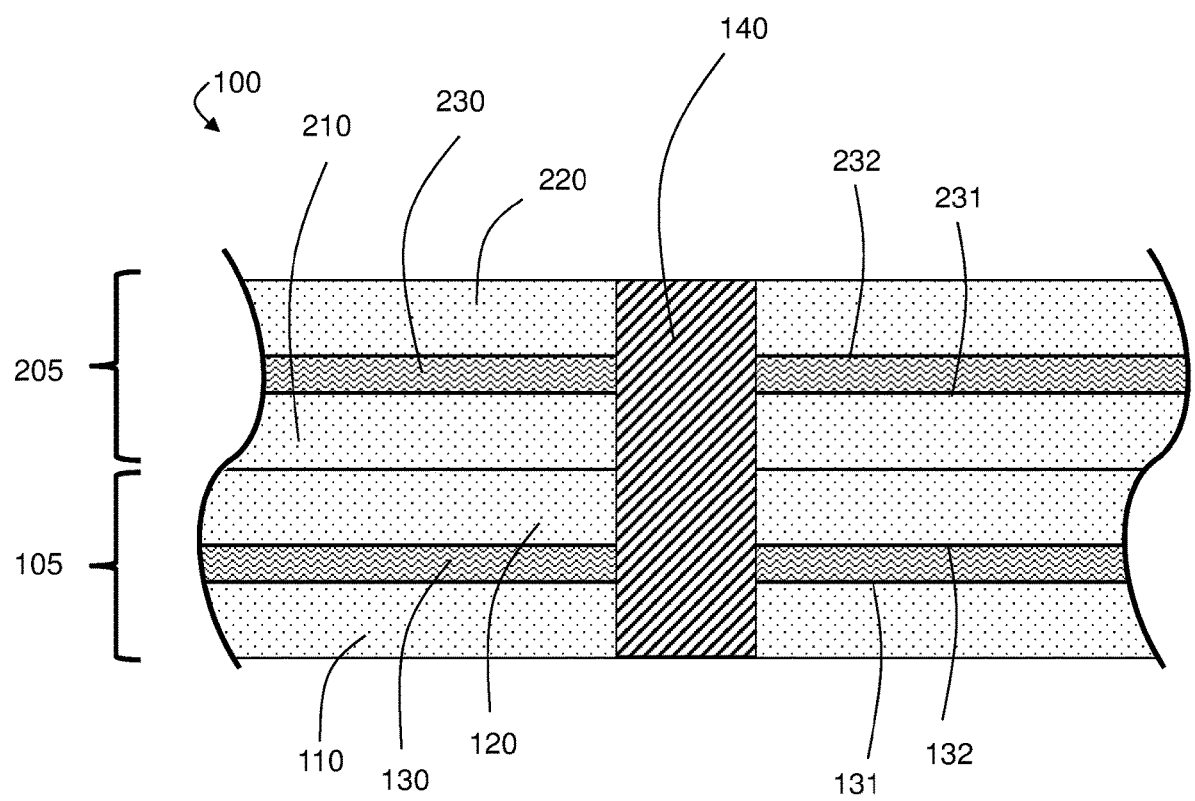
FIG. 5A is an exemplary schematic illustration depicting a cross-sectional view of an article comprising multiple double-sided electrode portions, according to certain embodiments.

In some embodiments, the electrically non-conductive layer, the first electrode portion, and the second electrode portion form a first double-sided electrode portion, and the article further comprises a second double-sided electrode portion that is adjacent to the first double-sided electrode portion. For example, referring to FIG. 5A, article 100 comprises first double-sided electrode portion 105 comprising first electrode portion 110, electrically non-conductive layer 130, and second electrode portion 120, as well as second double-sided electrode portion 205 comprising first electrode portion 210, electrically non-conductive layer 230, and second electrode portion 220, in accordance with certain embodiments. In some embodiments, the first double-sided electrode portion and the second double-sided electrode portion are substantially parallel. However, in some cases, the first double-sided electrode portion and the second double-sided electrode portion adjacent to the first double-sided electrode portion are concentric (e.g., in some cases in which the article is part of an electrochemical cell having a wound configuration). An article may comprise such a combination of the first double-sided electrode portion and a second double-sided electrode portion in cases where the article is part of an electrochemical cell comprising, for example, a plurality of double-sided electrode portions (e.g., in a stacked configuration).

In some cases, the electrode portions of the first double-sided electrode portion and the second double-sided electrode portion each have the same polarity. For example, in certain cases, the first double-sided electrode portion comprises a first anode portion and a second anode portion (e.g., positioned on either side of an electrically non-conductive layer), and the second double-sided electrode portion also comprises a first anode portion and a second anode portion (e.g., positioned on either side of a different electrically non-conductive layer). In some embodiments, an electrode portion of the first double-sided electrode portion may be directly adjacent to an electrode portion of the second double-sided electrode portion. In other words, in some cases, there are no intervening layers between at least a portion of an electrode portion of the first double-sided electrode portion and at least a portion of an electrode portion of the second double-sided electrode portion. Referring again to FIG. 5A, in some embodiments, second electrode portion 120 of first double-sided electrode portion 105 is directly adjacent to first electrode portion 210 of second double-sided electrode portion 205.

In some embodiments, the first double-sided electrode portion is electrically-coupled to the second double-sided electrode portion by the electrically conductive solid material region. For example, referring to FIG. 5A, first double-sided electrode portion 105 is electrically coupled to second double-sided electrode portion 205 by electrically conductive solid material region 140, in accordance with certain embodiments. In other words, in some cases, electrical current can flow from a component of the first double-sided electrode portion, through at least a portion of the electrically conductive solid material region, and to the second double-sided electrode portion. As one example, electrical current generated at first electrode portion 110 of first double-sided electrode portion 105 (e.g., during discharge of an electrochemical device comprising article 100) can flow from first electrode portion 110 to electrically conductive solid material region 140, and then flow from electrically conductive solid material region 140 to second electrode portion 220 of second double-sided electrode portion 205, in accordance with certain embodiments. In such a way, electrical current may be able to be transported from different double-sided electrode portions (e.g., double-sided anode portions) within the article, which may be useful in some cases in which the article is used at least in part to connect electrodes of an electrochemical device to an electrically conductive terminal.

In some embodiments, the electrically conductive solid material region extends through the first double-sided electrode portion and the second double-sided electrode portion in a direction normal to the first side and the second side of each electrically non-conductive layer. It should be understood that perfect perpendicularity is not required for an object to extend in a direction normal to another object (e.g., a side or surface), and in some cases, an angle between an object extending in a direction normal to another object (e.g., side or surface) and that other object (e.g., side or surface) can deviate from 90 degrees by up to 1 degree, up to 2 degrees, up to 5 degrees, or up 10 degrees. Referring again to FIG. 5A, electrically conductive solid material region 140 extends through first double-sided electrode portion 105 and second double-sided electrode portion 205 in a direction normal to first side 131 and second side 132 of electrically non-conductive layer 130 as well as first side 231 and second side 232 of electrically non-conductive layer 230. In some cases, an electrically conductive solid material region extending through the first double-sided electrode portion and the second double-sided electrode portion in the manner described herein may be formed by penetrating an article comprising the first double-sided electrode portion and the second double-sided electrode portion according to the methods described herein (e.g., by piercing the first double-sided electrode portion and the second double-sided electrode portion with a solid object such as a pin).

Figure 5B:
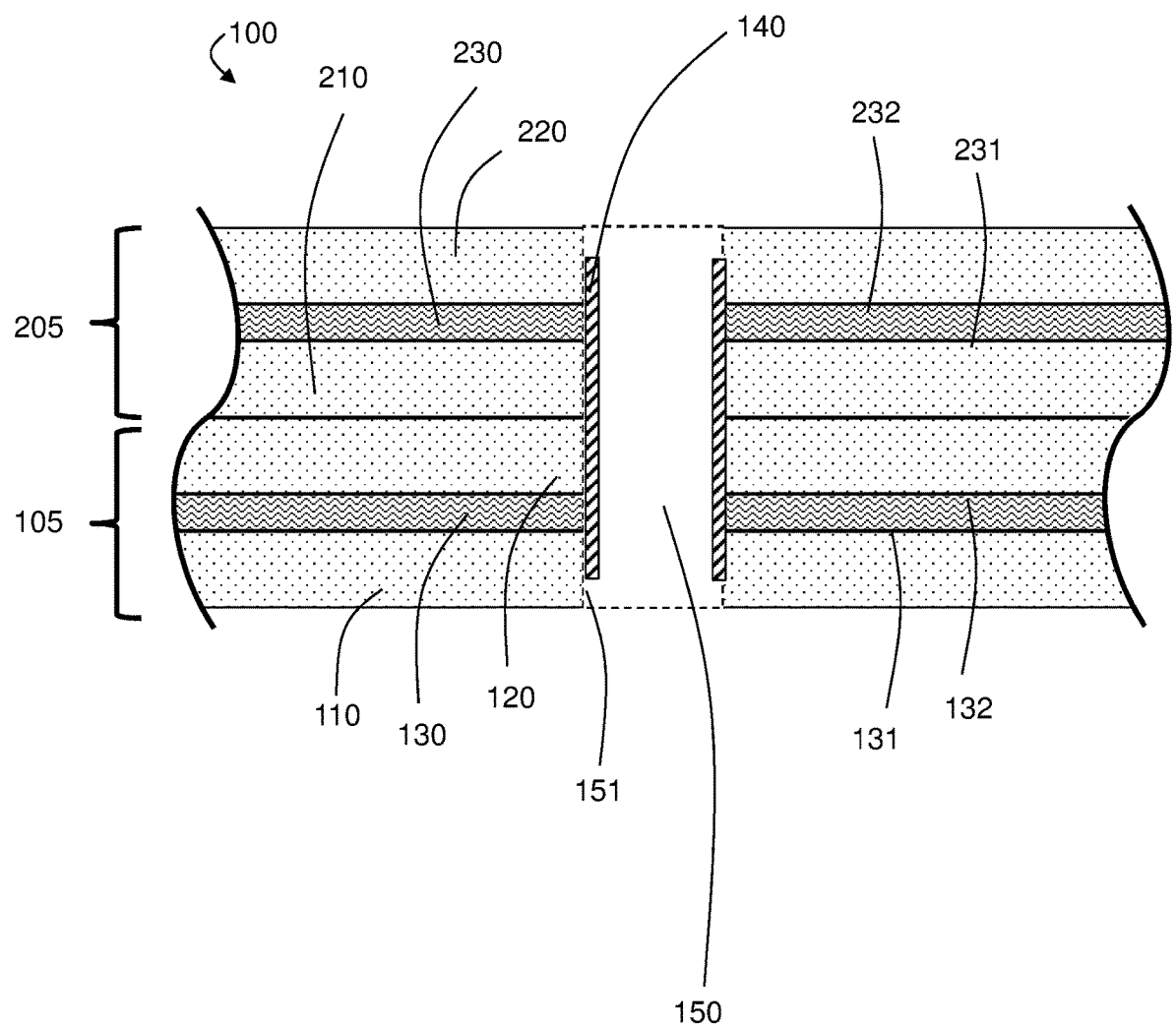
FIG. 5B is an exemplary schematic illustration depicting a cross-sectional view of an article comprising multiple double-sided electrode portions, according to certain embodiments.

In some embodiments, a cavity extends through the first double-sided electrode portion and the second double-sided electrode portion in a direction normal to the first side and the second side of each electrically non-conductive layer. In some cases, the cavity extending through the first double-sided electrode portion and the second double-sided electrode portion in the manner described above is formed according to the methods described herein. For example, in some cases, the article comprising the first double-sided electrode portion and the second-double-sided electrode portion is penetrated (e.g., with a solid object such as a pin), and after the article is penetrated, the cavity is formed (e.g., following a step of removing the solid object). FIG. 5B depicts exemplary cavity 150 extending through first double-sided electrode portion 105 and second double-sided electrode portion 205 in a direction normal to first side 131 and second side 132 of electrically non-conductive layer 130 and first side 231 and second side 232 of electrically non-conductive layer 230. As described above, in some cases, at least a portion of the electrically conductive solid material is positioned along a wall of the cavity. For example, referring again to FIG. 5B, at least a portion of wall 151 of cavity 150 comprises electrically conductive solid material region 140, in accordance with certain embodiments. In some such cases, the portion of the electrically conductive solid material region positioned along the wall of the cavity extends from the first double-sided electrode portion to the second double-sided electrode portion. In some such cases, that electrically conductive solid material region along the wall of the cavity electrically couples components of the first double-sided electrode portion (e.g., an electrode portion) with components of the second double-sided electrode portion (e.g., another electrode portion). It should be understood that while electrically conductive solid material region 140 in FIG. 5B is shown as a continuous region spanning from first electrode portion 110 to second electrode portion 220, in some cases, multiple discrete electrically conductive solid material regions may be located along wall 151 of cavity 150. For example, a first electrically conductive solid material region positioned along wall 151 of cavity 150 may extend from first electrode portion 110 to second electrode portion 120 of first double-sided electrode portion 105, while a second electrically conductive solid material region positioned along wall 151 of cavity 150 may extend from first electrode portion 210 to second electrode portion 220 of second double-sided electrode portion 205, where the first electrically conductive solid material region and the second electrically conductive solid material region are discrete, in accordance with certain embodiments.

Figure 5C:
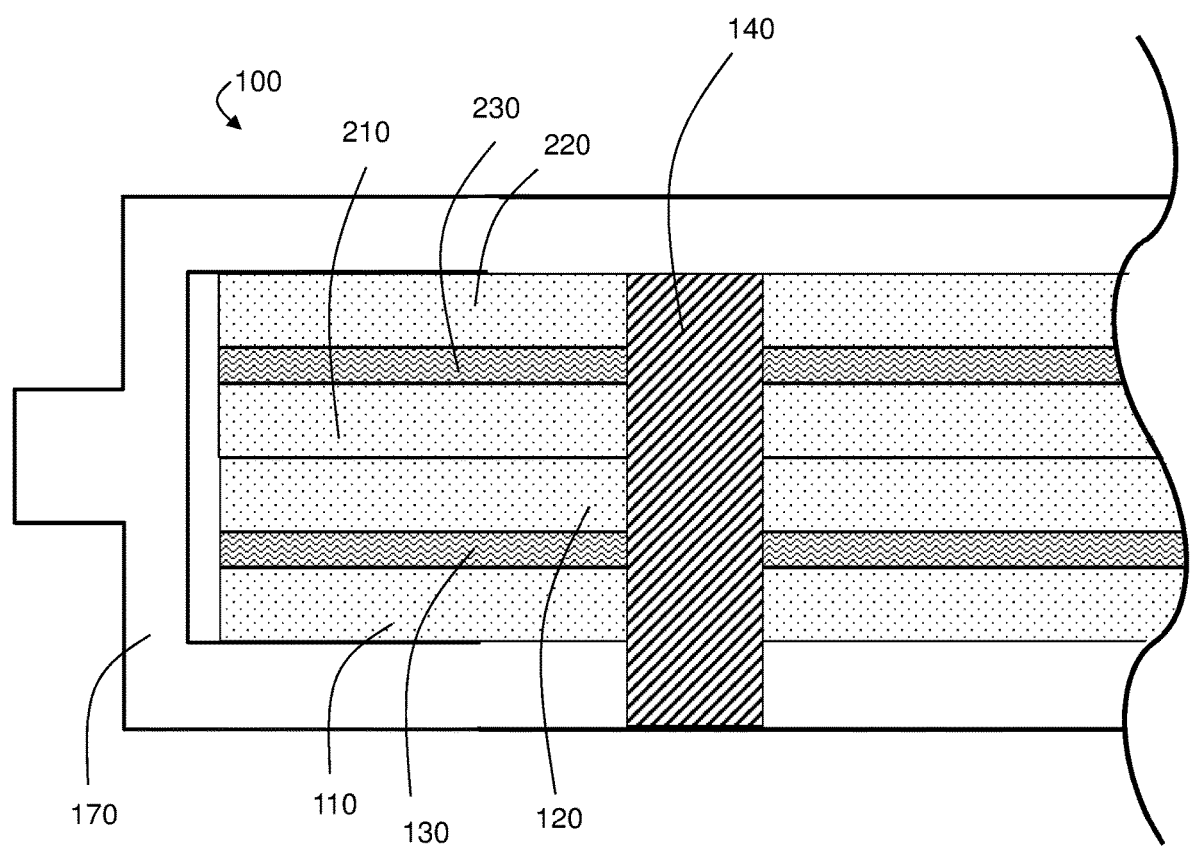
FIG. 5C is an exemplary schematic illustration depicting a cross-sectional view of an article comprising multiple double-sided electrode portions and an electrically conductive terminal, according to certain embodiments.

In some embodiments, the methods and articles described herein may be useful for transporting charge (e.g., flowing electrical current) to and from certain electrode portions of the articles described herein, for which efficient transport of charge would otherwise be difficult. Some such cases include those in which the article is electrically coupled to an electrically conductive terminal. For example, referring to FIG. 5C, article 100 is electrically coupled to electrically conductive terminal 170, in accordance with certain embodiments. In some cases, the electrically conductive terminal is used to transport charge between electrodes (e.g., anodes comprising lithium or lithium alloy) of an electrochemical device (e.g., battery) and external circuitry of the electrochemical device. In some cases, such as certain cases in which double-sided electrodes are used in the electrochemical device, certain electrode portions (e.g., interior electrode portions) of the double-sided electrodes may be separated from the electrically conductive terminal and/or electrically conductive solids in contact with the electrically conductive terminal by electrically non-conductive layers (e.g., release layers) of the double-sided electrodes, thereby making efficient transport of charge from those certain electrode portions to the electrically conductive terminal difficult. Referring again to FIG. 5C, for example, while first electrode portion 110 and second electrode portion 220 are in direct contact with an electrically conductive terminal 170, and can therefore efficiently transport charge to and from electrically conductive terminal 170 (e.g., during cycling of an electrochemical device comprising article 100), second electrode portion 120 and first electrode portion 210 are not in direct contact with electrically conductive terminal 170, and are separated from electrically conductive terminal 170 by electrically non-conductive layer 130 and electrically non-conductive layer 230, respectively, in accordance with certain embodiments. In the absence of certain features described herein (e.g., electrically conductive solid material regions formed, for example, during penetration steps), efficient charge transport between the electrically conductive terminal (e.g., electrically conductive terminal 170), and interior electrode portions such as second electrode portion 120 and first electrode portion 210 may be difficult, in some cases having a deleterious effect on the performance of electrochemical devices (e.g., batteries) comprising the article (e.g., due to high electrical resistances).

However, in some cases where features of the articles and methods described herein are employed, inefficient charge transport between interior electrode portions and electrically conductive terminals are avoided. For example, the presence of an electrically conductive solid material region extending through a first double-sided electrode portion and a second double-sided electrode portion in the manner described above may establish efficient electrical coupling between interior electrode portions and an electrically conductive terminal. Referring again to FIG. 5C, electrically conductive solid material region 140 extends from electrically conductive terminal 170, through first electrode portion 110, through electrically non-conductive layer 130, through second electrode portion 120, through first electrode portion 210, through electrically non-conductive layer 230, and to second electrode portion 220, in accordance with certain embodiments. In some such embodiments, second electrode portion 120 is electrically coupled to electrically conductive terminal 170 even with electrically non-conductive layer 130 present, because current can flow from second electrode portion 120 to electrically conductive solid material region 140, and that current can then flow from electrically conductive solid material region 140 to electrical conductive terminal 170. In some, but not necessarily all cases, the articles described herein comprising electrically conductive solid material regions may allow for efficient electrical connections from terminals to electrochemical devices, even when the electrochemical devices have configurations involving stacks of double-sided electrodes with embedded electrically non-conductive layers (e.g., release layers).

Figure 6A:
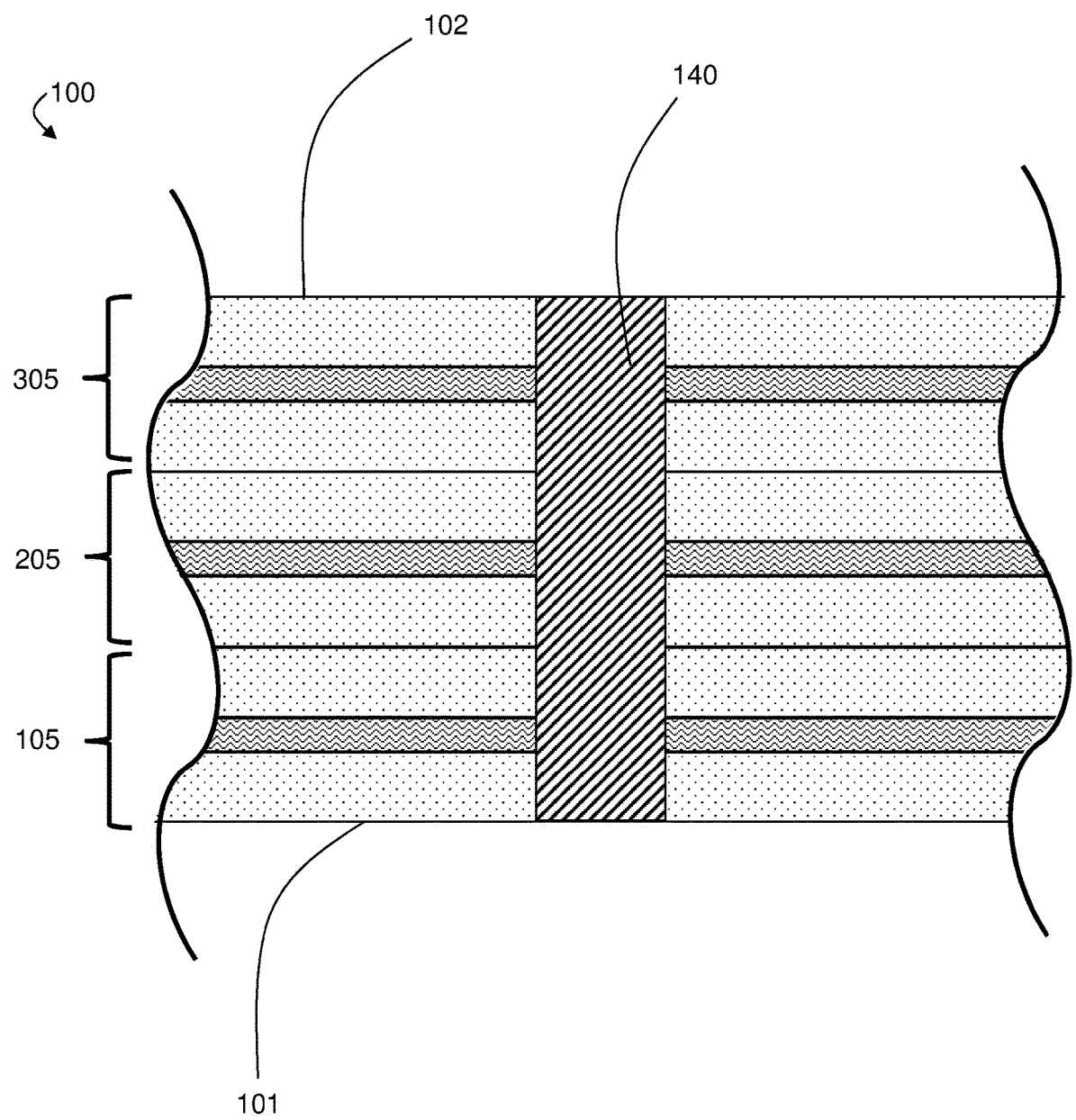
FIG. 6A is an exemplary schematic illustration depicting a cross-sectional view of an article comprising multiple double-sided electrode portions, according to certain embodiments.
Figure 6B:
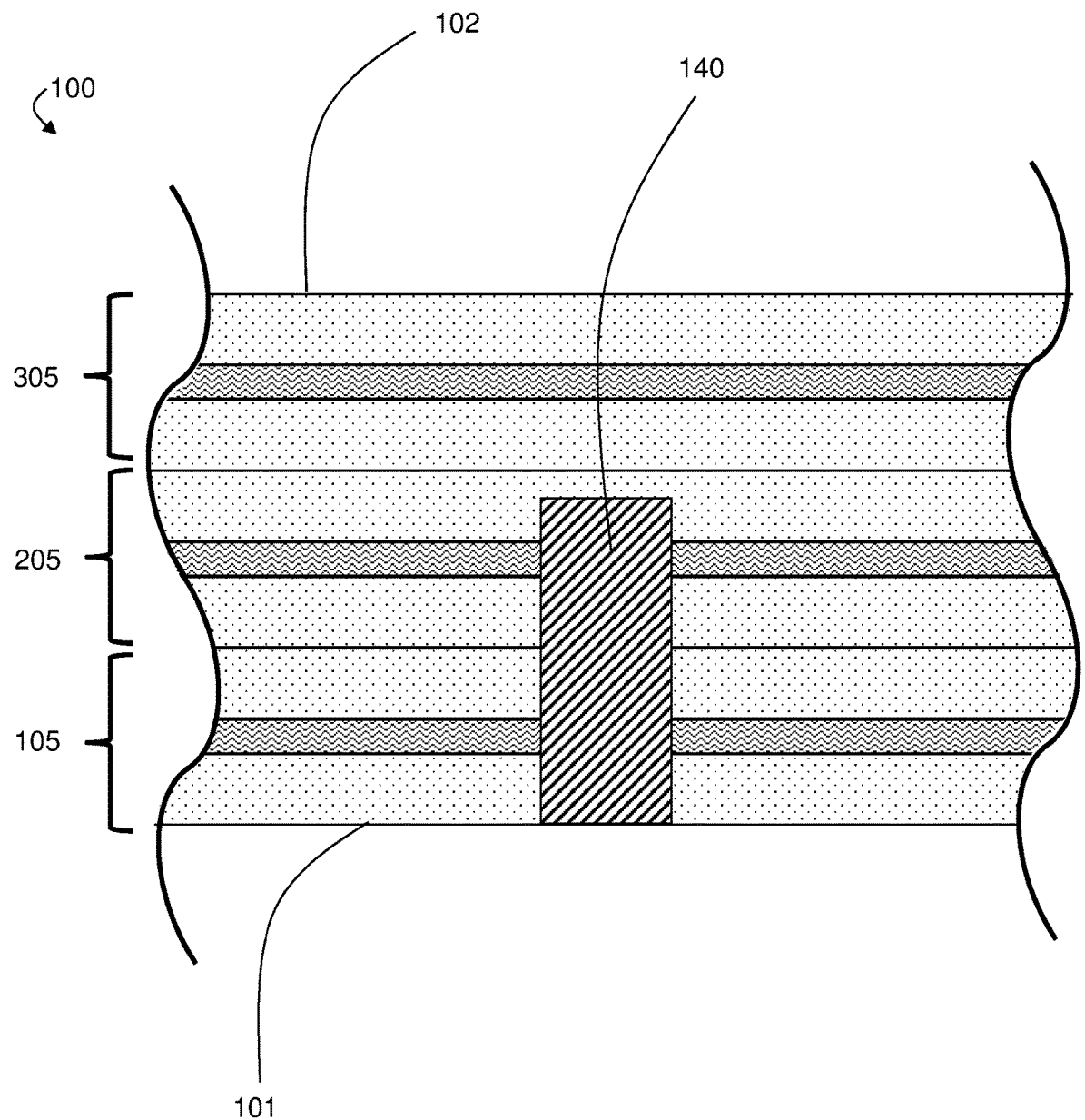
FIG. 6B is an exemplary schematic illustration depicting a cross-sectional view of an article comprising multiple double-sided electrode portions, according to certain embodiments.

While embodiments described above refer to articles comprising a first double-sided electrode portion and a second double-sided electrode portion, it should be understood that in some cases, the articles can comprise more than two double-sided electrodes (e.g., that are substantially parallel and adjacent, or concentric and adjacent to each other). FIGS. 6A-6B depicts exemplary articles 100 comprising first double-sided electrode portion 105, second double-sided electrode portion 205, and third double-sided electrode portion 305, in accordance with certain embodiments. In some embodiments, the article comprises at least one double-sided electrode portion, at least 2 double-sided electrode portions, at least 3 double-sided electrode portions, at least 4 double-sided electrode portions, at least 5 double-sided electrode portions, at least 6 double-sided electrode portions, at least 10 double-sided electrode portions, and/or up to 15 double-sided electrode portions, up to 20 double-sided electrode portions, up to 50 double-sided electrode portions, up to 100 double-sided electrode portions, or more. Other combinations of these ranges are possible. For example, in some embodiments the article comprises at least one double-sided electrode portion and up to 100 double-sided electrode portions.

The extent to which the electrically conductive solid material region and/or a cavity described herein extends through some of the double-sided electrode portions of articles described herein may depend on a number of factors, including the desired complexity of the fabrication process. In some embodiments, the electrically conductive solid material region extends through each double-sided electrode portion of the article. For example, referring to FIG. 6A, exemplary article 100 comprises three double-sided electrode portions (first double-sided electrode portion 105, second double-sided electrode portion 205, and third double-sided electrode portion 305), and electrically conductive solid material region 140 extends through each of the three double-sided electrode portions, in accordance with certain embodiments. Having the electrically conductive solid material region extend through each double-sided electrode portion of the article may be useful in certain cases in which it is desirable for a single electrically conductive solid material region to electrically couple each electrode portion of the double-sided electrode portions of the article. Similarly, in some embodiments, the cavity described herein extends through each double-sided electrode portion of the article (e.g., in articles that have been penetrated such that the object the penetrating the article passes through the entire article).

However, in some embodiments, the electrically conductive solid material region extends through some, but not all of the double-sided electrode portions of the article. For example, in some cases the article may comprise three double-sided electrode portions, and the electrically conductive solid material region may extend from the first double-sided electrode portion to the second double-sided electrode portion but without extending to the third double-sided electrode portion. FIG. 6B depicts one such embodiment, where electrically conductive solid material region 140 extends from first double-sided electrode portion 105 to second double-sided electrode portion 205, but does not reach third double-sided electrode portion 305, in accordance with certain embodiments. Similarly, in some embodiments, the cavity described herein extends through some, but not all of the double-sided electrode portions of the article. Such a cavity may be formed, for example, by penetrating some, but not all of the article (e.g., with a solid object such as a pin). Having the electrically conductive solid material region extend through some, but not all of the double-sided electrode portions of the article may be useful in a variety of situations. For example, in some cases, penetrating through the entire article may result in the formation of features on the surface of the article that may be deleterious to the performance of the article as part of a terminal for an electrochemical device. For example, in some cases, penetrating through the entire article (e.g., to form a cavity and/or electrically conductive solid material region that extends through each of the double-sided electrode portions) may form burrs. Removing such burrs may, in certain cases, add complexity and cost to fabricating the article and electrochemical devices. In some cases, such complexity and cost may be undesirable. However, in certain other cases, removal of such burrs or other features that are deleterious to the performance of the article may be performed.

Figure 7A:
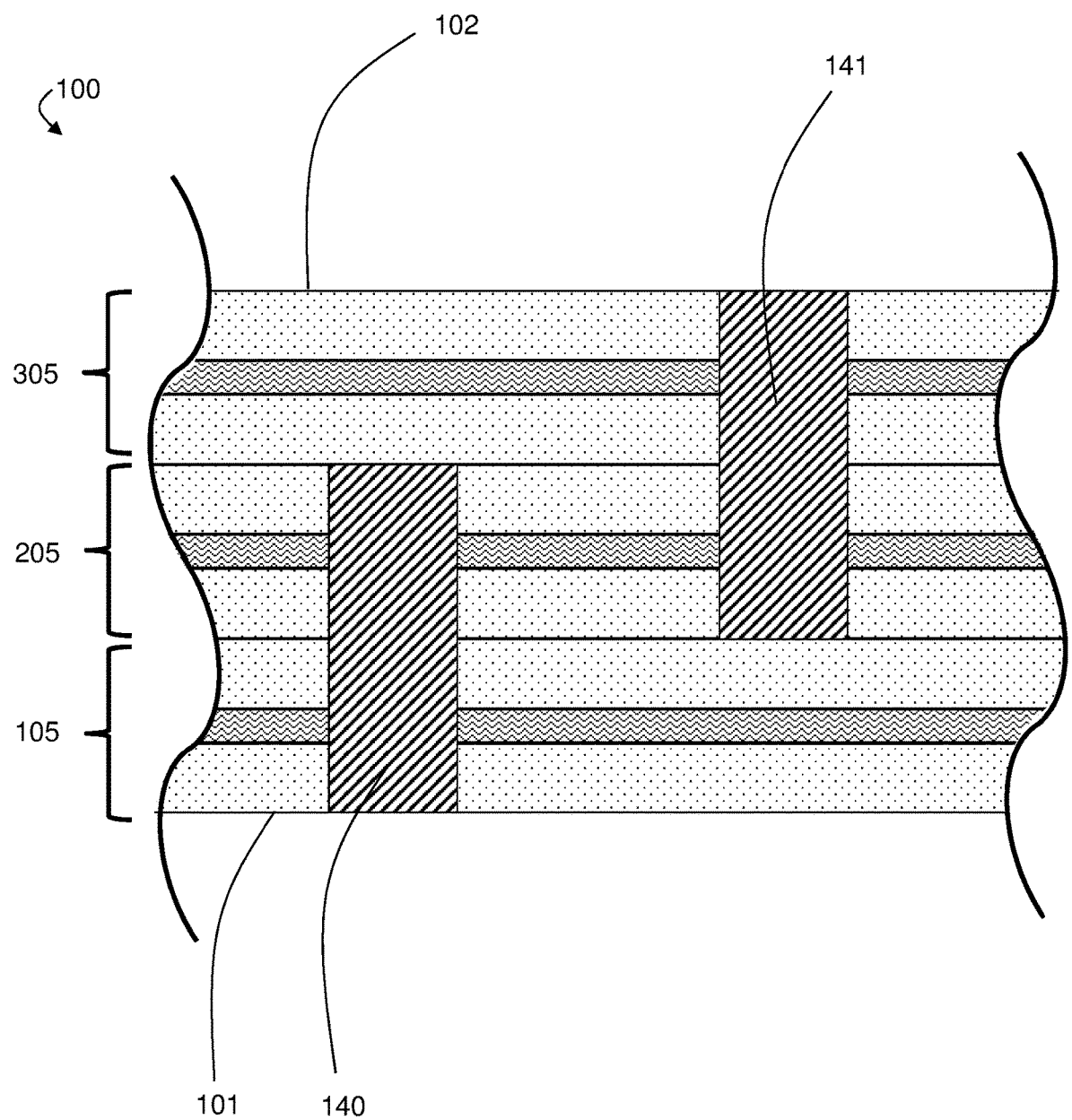
FIG. 7A is an exemplary schematic illustration depicting a cross-sectional view of an article comprising multiple double-sided electrode portions, according to certain embodiments.
Figure 7B:
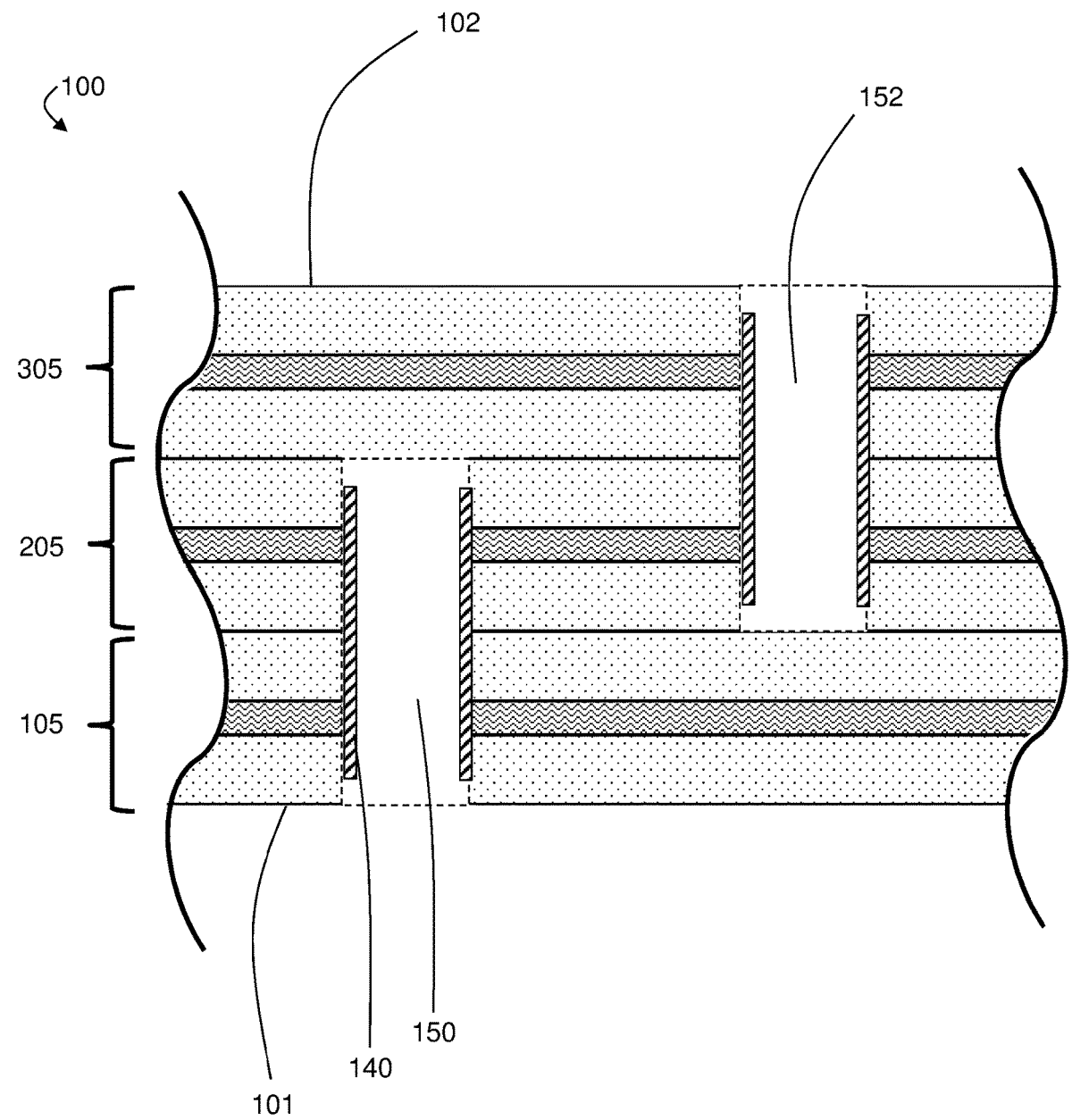
FIG. 7B is an exemplary schematic illustration depicting a cross-sectional view of an article comprising multiple double-sided electrode portions, according to certain embodiments.

In some embodiments, the article comprises multiple electrically conductive solid material regions and/or cavities. For example, in some embodiments, the electrically conductive solid material region is a first electrically conductive solid material region, and the article comprises a second electrically conductive solid material region. Similarly, in some cases, the cavity described herein is a first cavity, and the article comprises a second cavity. Such multiple electrically conductive solid material regions and/or cavities may be formed as a result of multiple penetration steps (e.g., penetrating the article multiple times with one or more solid objects (e.g., pins, either sequentially or simultaneously). Having multiple electrically conductive solid material regions and/or cavities extending through portions of the article as described above may, in some cases, allow for improved electrical connections between components within the article, thereby improving performance (e.g., an electrochemical cell comprising the article). FIG. 7A depicts exemplary article 100 comprising first electrically conductive solid material region 140 and second electrically conductive solid material region 141, in accordance with certain embodiments. Similarly, FIG. 7B depicts exemplary article 100 comprising first cavity 150 and second cavity 152.

In some embodiments, the article comprises a first side and a second side opposite the first side. For example, referring to FIG. 1B, exemplary article 100 comprises first side 101 and second side 102 opposite first side 101. In some cases, the first side of the article is substantially parallel to the second side of the article. In certain cases, the first side and the second side are substantially parallel to the electrically non-conductive layer. For example, referring again to FIG. 1B, first side 101 and second side 102 of article 100 are substantially parallel to first side 131 and second side 132 of electrically non-conductive layer 130. In some embodiments, two objects (e.g., surfaces, layers, sides, etc.) that are substantially parallel have regions that are up to 1 degree, up to 2 degrees, up to 5 degrees, or up to 10 degrees off of parallel.

In some embodiments, the article comprises a first side and a second side opposite the first side, and the electrically conductive solid material region extends from the first side to the second side. Referring to FIG. 2, for example, article 100 comprises electrically conductive solid material region 140, which extends from first side 101 of article 100 to second side 102 of article 100, where first side 101 is opposite second side 102. As another example, referring to FIG. 6A, electrically conductive solid material region 140 extends from first side 101 of exemplary article 100 to second side 102 of article 100. Similarly, in some cases, the cavity (e.g., cavity 150) described herein extends from the first side to the second side of the article. The cavity and/or electrically conductive solid material region may extend from the first side of the article to the second side of the article in cases in which the entirety of the article is penetrated. For example, in some cases, the article is penetrated with a solid object (e.g., pin) such that the solid object pierces the first side of the article, travels through the entire interior of the article, and exits the second side of the article. As described above, penetrating the article in such a way, resulting in the formation of an electrically conductive solid material region and/or cavity extending from the first side of the article to the second side of the article may be useful in cases in which it is desired that all of the electrode portions and/or double-sided electrode portions of the article be electrically coupled in a single penetration step.

However, in some embodiments, the electrically conductive solid material regions and/or cavities described herein extend from the first side to some point within the interior of the article, but do not extend all the way to the second side of the article.

In some embodiments in which the article comprises multiple electrically conductive solid material regions and/or cavities, the electrically conductive solid material regions and/or cavities may extend through different regions of the article. In some such cases, electrically conductive solid material regions and/or cavities are arranged to provide for efficient charge transport from electrode portions within the article (e.g., interior electrode portions of double-sided electrode portions). In some embodiments, at least one electrically conductive solid material region extends from the first side of the article but does not reach the second side, and at least one electrically conductive solid material region extends from the second side of the article but does not reach the first side. Similarly, in some embodiments, at least one cavity extends from the first side of the article but does not reach the second side, and at least one cavity extends from the second side of the article but does not reach the first side. For example, referring again to FIG. 7A, article 100 comprises first electrically conductive solid material region 140 and second electrically conductive solid material region 141, in accordance with certain embodiments. In some cases, electrically conductive solid material region 140 extends from first side 101 of article 100, but does not reach second side 102 of article 100, while second electrically conductive solid material region 141 extends from second side 102 but does not reach first side 101, in accordance with certain embodiments. Similarly, for example, referring again to FIG. 7B, article 100 comprises first cavity 150 and second cavity 152, in accordance with certain embodiments. In some cases, first cavity 150 extends from first side 101 of article 100, but does not reach second side 102 of article 100, while second cavity 152 extends from second side 102 but does not reach first side 101, in accordance with certain embodiments. Such configurations, where at least one cavity and/or electrically conductive solid material region extends from a first side but not to a second side, and at least one cavity and/or electrically conductive solid material region extends from a second side but not to a first side of the article, can allow one to electrically couple all electrode portions of the article while avoiding disadvantages that can arise when cavities and/or electrically conductive solid materials extend completely through the article (e.g., burring and the like, as described above). Some such configurations can be achieved by, for example, penetrating the article from multiple different sides of the article (e.g., penetrating the article from the first side and from the second side).

Figure 8:
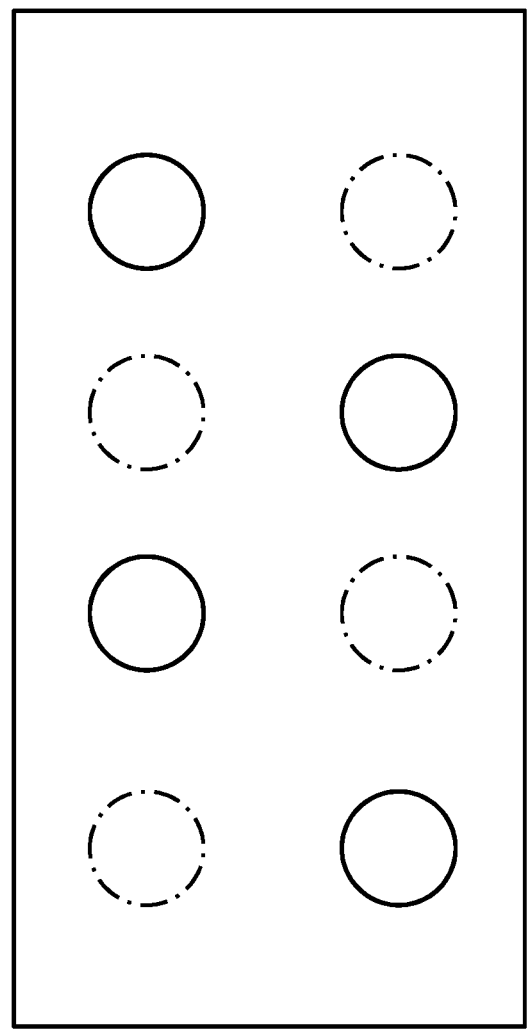
FIG. 8 is an exemplary schematic illustration depicting a cross-sectional view of an article comprising multiple electrode portions, according to certain embodiments.

In some cases, the article comprises cavities and/or electrically conductive solid material regions whose extensions through the article (e.g., from the first side to the second side, or from the second side of the first side) alternate. For example, FIG. 8 depicts a top-down view of exemplary article 100, in accordance with certain embodiments. In FIG. 8, each of the eight circles depicted represent a cavity and/or electrically conductive solid material region extending through article 100 in a direction perpendicular to the plane of FIG. 8. The solid circles in FIG. 8 represent cavities and/or electrically conductive solid material regions extending from the top of the article toward the bottom of the article (not shown) in a direction going into the page of FIG. 8 (but not reaching the bottom of the article), while dashed circles represent cavities and/or electrically conductive solid material regions extending from the bottom of the article (not shown) toward the top of the article (shown) in a direction going out of the page of FIG. 8 (but not reaching the top of the article). In some cases, such an alternating pattern of cavities and/or electrically conductive solid material regions extending through the article may provide for efficient transport of electrical current to and from electrode portions within the article (e.g., when the article is a part of a terminal of an electrochemical cell). Such a configuration may, in certain cases, be achieved by penetrating (e.g., piercing with a solid object such as a pin) the article in an alternating manner as shown in FIG. 8.

As mentioned above, in some embodiments, the article described herein is a part of an electrochemical device. The electrochemical device may, in some cases, be or comprise an electrochemical cell. In certain cases, the electrochemical device comprises a plurality of electrochemical cells. For example, in certain cases, the electrochemical device is a multi-cell battery, such as a multi-cell lithium or lithium ion battery. In certain cases, the electrode portions and/or double-sided electrode portions described above are portions of the electrodes in the electrochemical device. In certain cases, the portions of the electrodes and/or double-sided electrode portions in the article described herein may be part of an extension of the electrodes of the electrochemical device that is used to couple to a terminal of the electrochemical device (e.g., a battery terminal). As described in more detail below, the electrochemical device may comprise certain other components other than the components of the article described above. For example, the electrochemical device may comprise electrodes having an opposite polarity relative to the polarities of the electrode portions contained in the article described above, as well as separators, electrolyte, and/or current collectors.

In some embodiments, the article is electrically coupled to an electrically conductive terminal of the electrochemical device. For example, referring back to FIG. 4A, electrically conductive terminal 170 may be an electrically conductive terminal of an electrochemical device comprising article 100. In some cases, the electrically conductive terminal is a battery terminal. In some embodiments, the electrically conductive terminal electrically coupled to the article is an anode terminal. For example, in some cases, the electrode portions of the article (e.g., the first electrode portion, the second electrode portion) are anode portions, and the article is electrically coupled to an anode terminal. The methods described herein and features of the article described herein may allow, in some, but not necessarily all cases, for relatively efficient transfer of charge (e.g., current) from electrodes of the electrochemical cell to the electrically conductive terminal for example, by providing for electrically conductive pathways from electrode portions (e.g., interior electrode portions) to the electrically conductive terminal, even in cases in which electrodes of the electrochemical device comprise electrically non-conductive layers. Those of ordinary skill in the art, guided by the present disclosure, would understand suitable materials and methods for electrically coupling the article described herein to an electrically conductive terminal of an electrochemical device. For example, in some cases, the electrically conductive terminal is a tab made of an electrically conductive solid (e.g., a metal, metal alloy, composite, conductive polymer, and/or combinations thereof). Suitable electrically conductive solids may include, for example, metal foils (e.g., aluminum foil), polymer films, metallized polymer films (e.g., aluminized plastic films, such as aluminized polyester film), electrically conductive polymer films, polymer films having an electrically conductive coating, electrically conductive polymer films having an electrically conductive metal coating, and polymer films having conductive particles dispersed therein.

In some embodiments, the electrically conductive terminal includes one or more conductive metals such as aluminum, copper, chromium, stainless steel and nickel. For example, an electrically conductive terminal may include a copper metal layer. Optionally, another conductive metal layer, such as titanium, may be positioned on the copper layer. The titanium may promote adhesion of the copper layer to another material, such as an electroactive material layer (e.g., of the first electrode portion). Other electrically conductive terminals may include, for example, expanded metals, metal mesh, metal grids, expanded metal grids, metal wool, woven carbon fabric, woven carbon mesh, non-woven carbon mesh, and carbon felt. Furthermore, an electrically conductive terminal may be electrochemically inactive. In other embodiments, however, an electrically conductive terminal may comprise an electroactive material. For example, an electrically conductive terminal may include a material which is used as an electroactive material layer (e.g., as an anode or a cathode such as those described herein).

In some embodiments, the article further comprises a liquid electrolyte in electrochemical communication with the first electrode portion and/or the second electrode portion. For example, in some cases where the article is part of an electrochemical device (e.g., battery stack), liquid electrolyte in electrochemical communication with the first electrode portion (e.g., first electrode portion 110) and/or second electrode portion (e.g., second electrode portion 120) may be present to facilitate electrochemical reactions in electrochemical cells during charging and/or discharging processes of the electrochemical device. Suitable electrolytes, including liquid electrolyte, are described in more detail below.

Some embodiments described herein comprise cycling an electrochemical device comprising the article described herein. For example, in some cases, the electrochemical device comprising the article described herein is charged (e.g., by a power supply or charger applying a voltage to electrochemical cells within the electrochemical device), and during the charging process current flows from the power supply to certain electrodes of the electrochemical device via the electrically conductive terminal and the electrode portions (e.g., part of double-sided electrode portions) of the article described herein. In some such cases, current flows relatively efficiently (e.g., with relatively low resistance) from the electrodes to the power supply/charger due at least in part to the presence of the electrical coupling of the electrode portions of the article (e.g., via electrically conductive solid material regions extending through electrically non-conductive layers). Similarly, in some embodiments the electrochemical device comprising the article described herein is discharged (e.g., to generate electricity via electrochemical reactions between electrodes of the electrochemical device), and electrical current is efficiently transferred from electrodes of the electrochemical device to the electrically conductive terminal (e.g. anode terminal) due at least in part to the presence of the electrically conductive solid material regions and/or cavities described above (e.g., formed by penetrating the article).

Some embodiments may comprise penetrating the article such that an electrical coupling between the first electrode portion and a second electrode portion is established, and then cycling an electrochemical device comprising that article.

The electrochemical cell may have any of a variety of suitable configurations. For example, in some cases, the electrochemical device has a stacked configuration. In some such stacked configurations, components of the electrochemical device (e.g., electrodes, current collectors, separators, etc.) may be coated or deposited onto each other as layer, or alternately, the components may be formed separately and then attached to each other (e.g., via lamination). In some cases, the electrochemical device has a wound configuration, where the components of the electrochemical device are wrapped such that they wind around a central axis to form a cylindrical electrochemical device. In some embodiments, the electrochemical device has a folded configuration, such as a "Z-fold" configuration or a "W-fold" configuration. In certain cases, the electrochemical device has a "jelly roll" prismatic configuration.

Figure 9A:
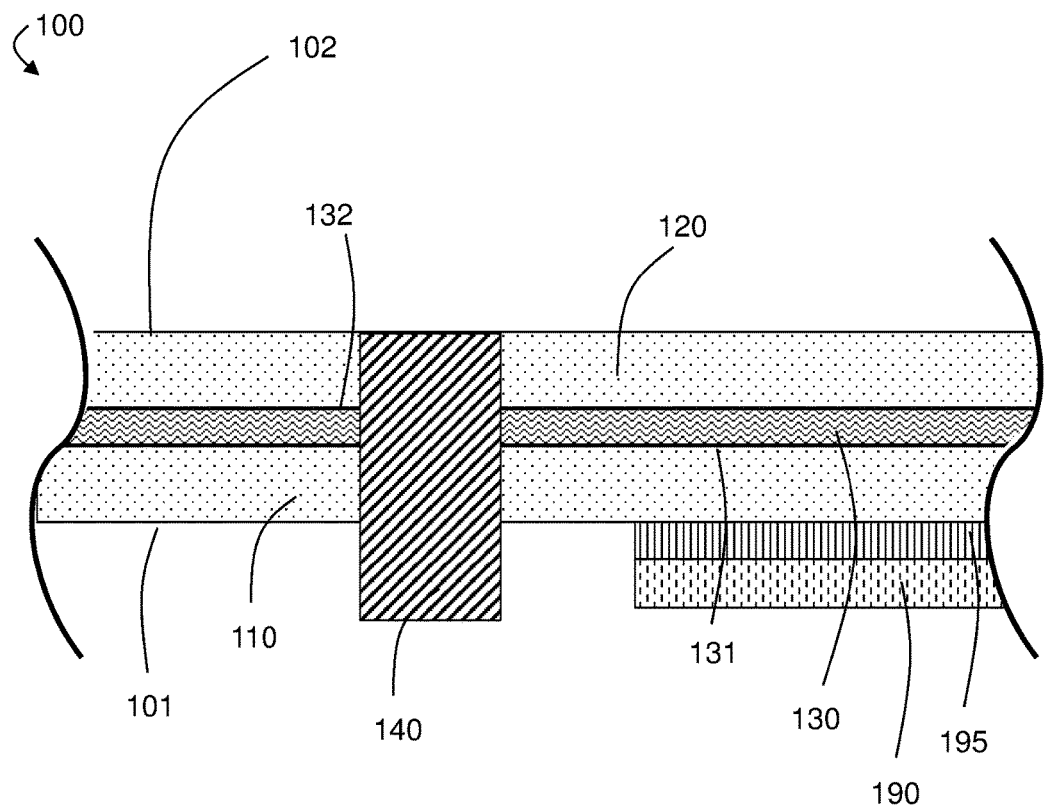
FIG. 9A is an exemplary schematic illustration depicting a cross-sectional view of an article comprising multiple electrode portions, according to certain embodiments.

In some embodiments, a portion of the first electrode portion or the second electrode portion is covered by a third electrode portion. For example, in some cases, the article is part of an electrochemical device (e.g., comprising an electrochemical cell), and the electrochemical device comprises a third electrode portion that covers a portion of either the first electrode portion or the second electrode portion such that an electrochemical reaction can take place involving the electrode active material of the first electrode portion (e.g., an anode portion) or the second electrode portion (e.g., an anode portion) and the electroactive material of the third electrode portion (e.g., a cathode portion). Referring to FIG. 9A, third electrode portion 190 covers a portion of first electrode portion 110, in accordance with certain embodiments. In some embodiments, the third electrode portion has a polarity that is opposite of the polarity of the first electrode portion and the second electrode portion. For example, in some cases, the first electrode portion and the second electrode portion are anode portions (e.g., comprising lithium and/or lithium alloy), and the third electrode portion covering a portion of the first electrode portion and/or the second electrode portion is a cathode portion. In some cases, a separator portion is between the third electrode portion and the first electrode portion or second electrode portion. FIG. 9A depicts optional separator portion 195, in accordance with certain embodiments. In some embodiments, the third electrode portion covers some, but not all of the first electrode portion or the second electrode portion. In some cases, it is undesirable for the electrically conductive solid material region and/or cavity that extends through portions of the article to extend through any of the third electrode portion, because establishing electrical coupling between the third electrode portion and the first electrode portion or the second electrode portion may cause short-circuiting of an electrochemical device that comprises the article. Therefore, in some embodiments, the electrically conductive solid material region or cavity that extends through the first electrode portion, the electrically non-conductive layer, and the second electrode portion does not extend through any of the third electrode portion. For example, referring again to FIG. 9A, electrically conductive solid material region 140 extends through first electrode portion 110, electrically non-conductive layer 130, and second electrode portion 120, but electrically conductive solid material region 140 does not extend or even intersect with third electrode portion 190.

Figure 9B:
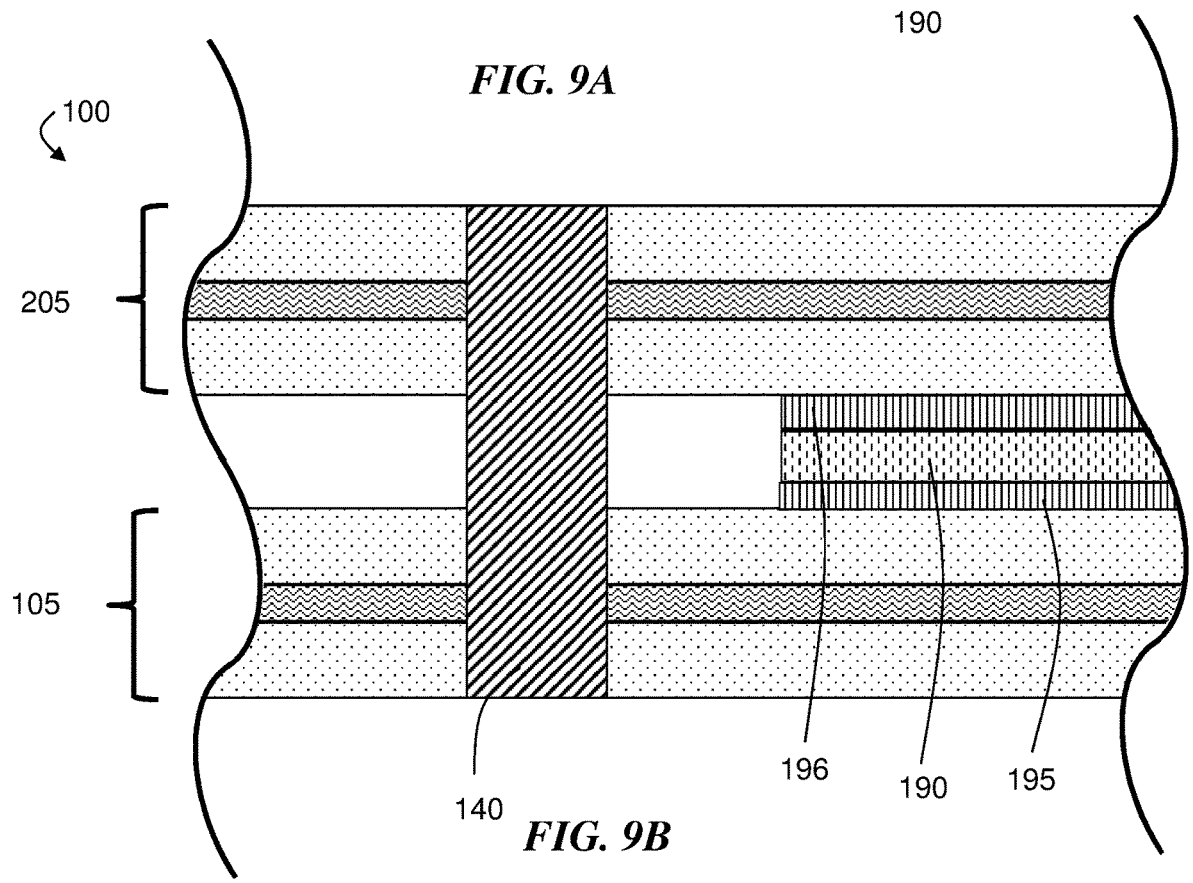
FIG. 9B is an exemplary schematic illustration depicting a cross-sectional view of an article comprising multiple double-sided electrode portions, according to certain embodiments.

In some embodiments, the article comprises a third electrode portion disposed between a portion of the first double-sided electrode portion and a portion of the second double-sided electrode portion. For example, in some cases, the article is part of an electrochemical device (e.g., comprising electrochemical cells), and the electrochemical device comprises a third electrode portion disposed between the first double-sided electrode portion and the second double-sided electrode portion such that an electrochemical reaction can take place involving electrode active material of the third electrode portion and the electrode active material of the first double-sided electrode portion and/or the second double-sided electrode portion (e.g., during charging or discharging of the electrochemical device). Referring to FIG. 9B, exemplary article 100 comprises first double-sided electrode portion 105 and second double-sided electrode portion 205, and the article further comprises third electrode portion 190 disposed between first double-sided electrode portion 105 and second double-sided electrode portion 205.

In some embodiments, the third electrode portion has a polarity that is different than the polarity of an electrode portion of the first double-sided electrode portion and an electrode portion of the second double-sided electrode portion. For example, in some cases, the first double-sided electrode portion comprises anode portions, the second double-sided electrode portion comprises anode portions (e.g., comprising lithium and/or lithium alloy), and the third electrode portion disposed between the first double-sided electrode portion and the second double-sided electrode portion is a cathode portion. In some cases, the third electrode portion is disposed between some of, but not all of the first double-sided electrode portion and the second double-sided electrode portion. As mentioned above, it may be undesirable for the electrically conductive solid material region and/or cavity that extends through portions of the article to extend through any of the third electrode portion, in order to avoid short-circuiting. Therefore, in some cases, the electrically conductive solid material region that extends through the first double-sided electrode portion and the second double-sided electrode portion does not extend through the third electrode portion disposed between the first double-sided electrode portion and the second double-sided electrode portion. For example, referring again to FIG. 9B, electrically conductive solid material region 140 extends through first double-sided electrode portion 105 and second double-sided electrode portion 205, but electrically conductive solid material region 140 does not extend through or intersect with third electrode portion 190, in accordance with certain embodiments. In some cases, the article further comprises a separator portion between the third electrode portion and the first double-sided electrode portion, and the article further comprises a separator portion between the third electrode portion and the second double-sided electrode portion. FIG. 9B depicts exemplary optional separator portions 195 and 196, in accordance with certain embodiments.

Figure 11A:
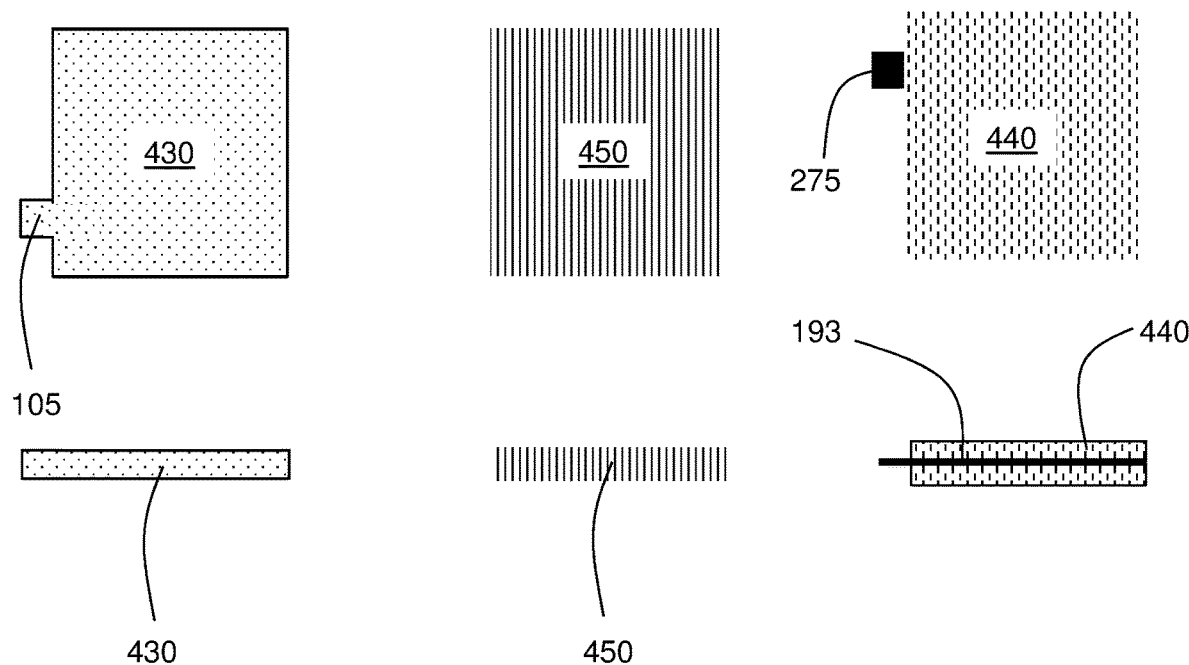
FIG. 11A is an exemplary schematic illustration depicting a top-down view of electrodes and a separator of an electrochemical device, according to certain embodiments.

FIGS. 11A-11F show schematic illustrations of exemplary electrochemical devices and components, according to certain embodiments. FIG. 11A depicts top-down (upper) and cross-sectional (lower) views of exemplary electrochemical device components, including anode 430, separator 450, and cathode 440, according to certain embodiments. Though the below descriptions refer to anode 430 (e.g., a double-sided vapor-deposited lithium metal anode) and cathode 440 (e.g., a double-sided cathode comprising a cathode active material deposited on current collector 193 (e.g., a metal layer)), it should be understood that other configurations are possible, such as embodiments that include cathode 430 and anode 440. Anode 430 comprises double-sided anode portion 105, in accordance with certain embodiments, and double-sided anode portion 105 is an extension of anode 430 (e.g., as the article described herein). Further, in some embodiments, cathode 440 comprises current collector extension 275.

Figure 11B:
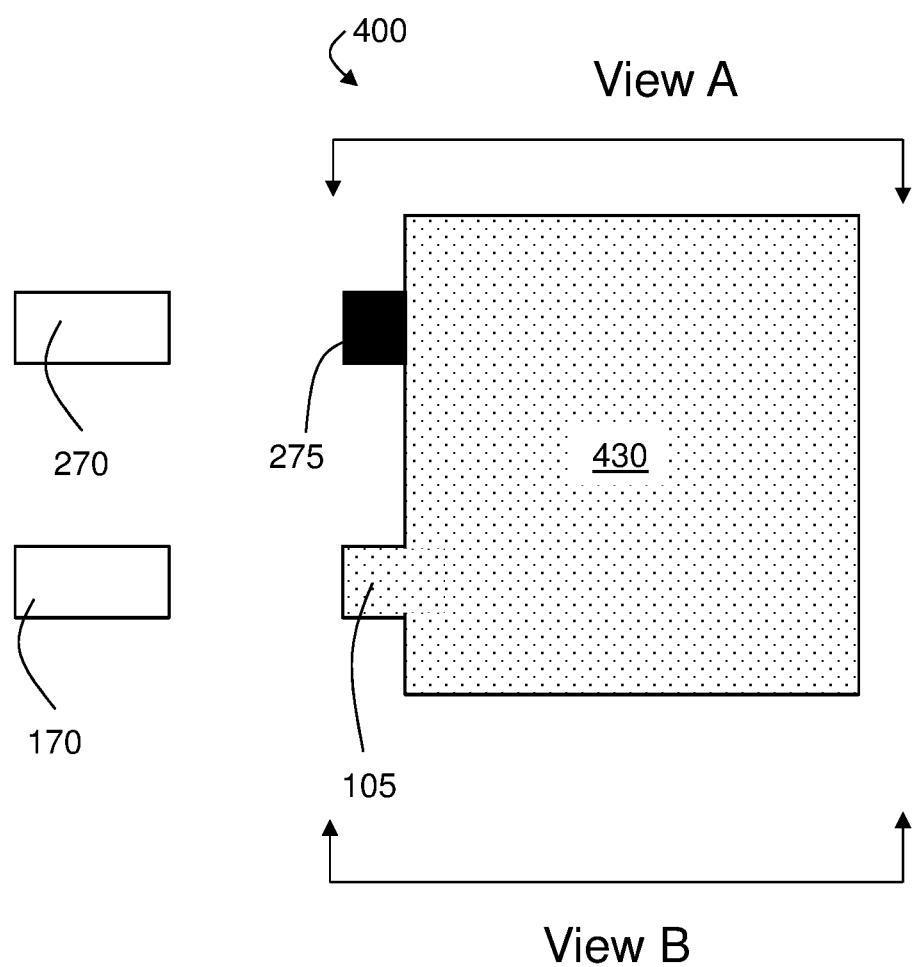
FIG. 11B is an exemplary schematic illustration depicting an electrochemical device comprising an anode and anode extension, and a cathode and a cathode current collector extension, according to certain embodiments.

FIG. 11B shows a top-down view of exemplary electrochemical device 400 comprising anode 430 (including double-sided anode portion 105), separator 450 (hidden behind cathode 430), and cathode 440 (hidden behind anode 430 and separator 450, but including cathode current collector extension 275, which is not hidden), according to certain embodiments. As described above, in certain embodiments, electrical coupling between electrode portions of double-sided anode portion 105 of electrochemical device 400 may be established by penetrating double-sided anode portion 105 (e.g., with a solid object such as a pin), thereby forming an electrically conductive solid material region. In some embodiments, electrically conductive terminal 170 in FIG. 11B is electrically coupled to the extension of anode 430 comprising double-sided electrode portion 105 by bringing electrically conductive terminal 170 into contact with double-sided anode portion 105 and penetrating both double-sided anode portion 105 and electrically conductive terminal 170. In some embodiments, electrically conductive terminal 270 is electrically coupled to current collector portion extension 275 of current collector 193, such that a complete electrical circuit involving electrochemical device 400 is established.

Figure 11C:
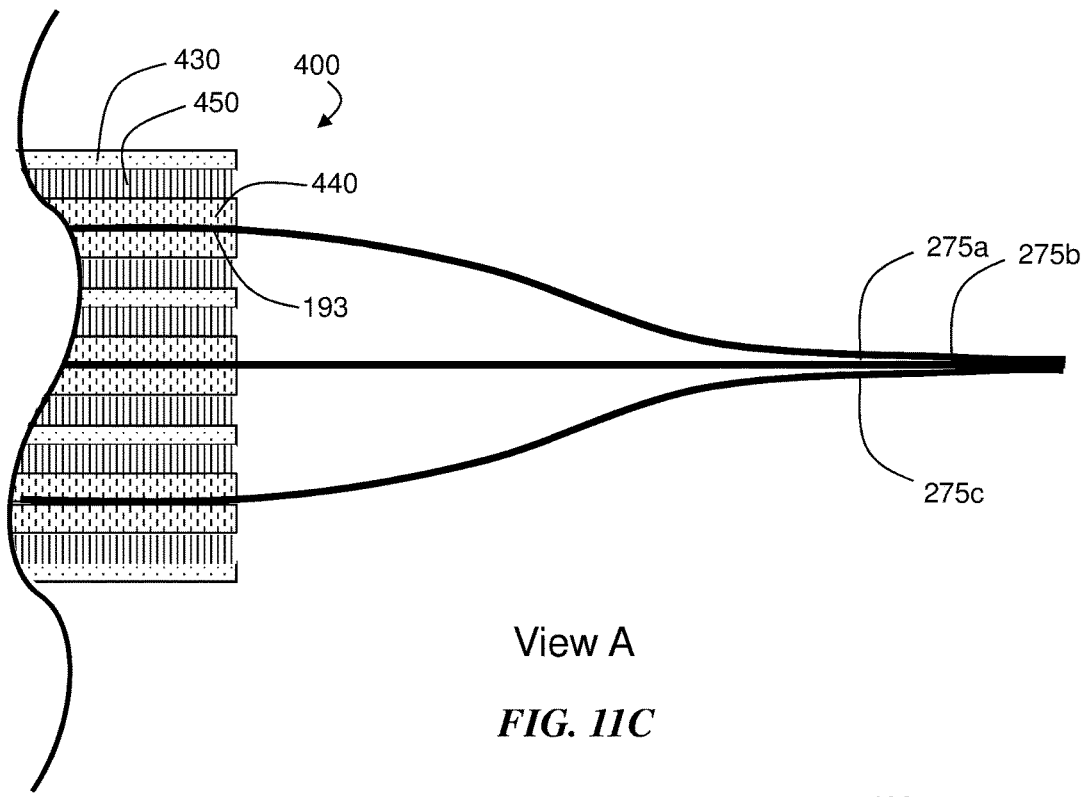
FIG. 11C is an exemplary schematic illustration of a cross-sectional view of the electrochemical device of FIG. 11B, according to certain embodiments.

FIG. 11C shows a schematic cross-sectional illustration of electrochemical device 400 as viewed from View A shown in FIG. 11B, in accordance with certain embodiments. As shown in FIG. 11C, electrochemical device 400 has a stacked configuration and comprises the following components in arranged in order: anode 430, separator 450, and cathode 440 comprising current collector 193, in accordance with certain embodiments. In some cases, as shown in FIG. 11C, this arrangement of components is repeated in electrochemical device 400. In FIG. 11C, current collector extension 275a extends past the other components of electrochemical device 400, and can, in some cases, be used to form an electrical connection with a terminal (e.g., cathode terminal 270 shown in FIG. 11B). Similarly, other current collector extensions, such as current collector extension 275b and current collector extension 275c can also extend past the other components of electrochemical device 400 and be used to form an electrical connection with a terminal, according to certain embodiments.

Figure 11D:
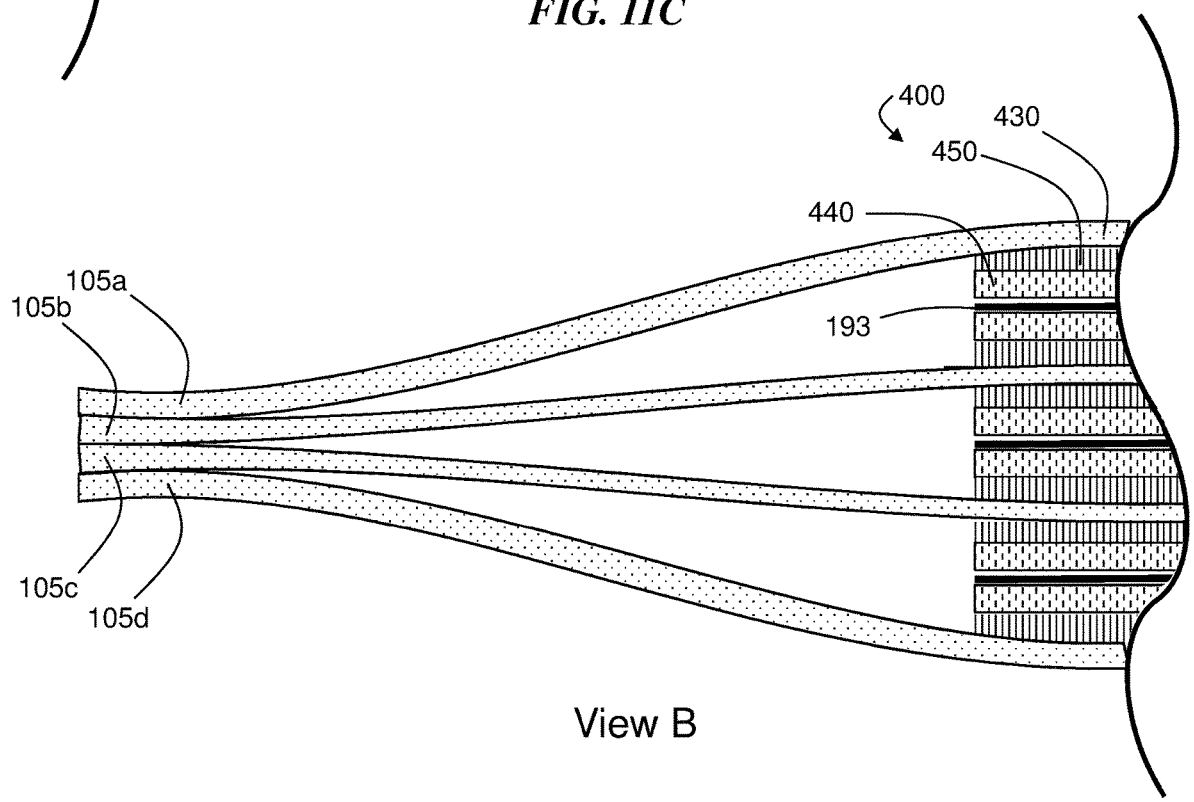
FIG. 11D is an exemplary schematic illustration of a cross-sectional view of the electrochemical device of FIG. 11B, according to certain embodiments.
Figure 11E:
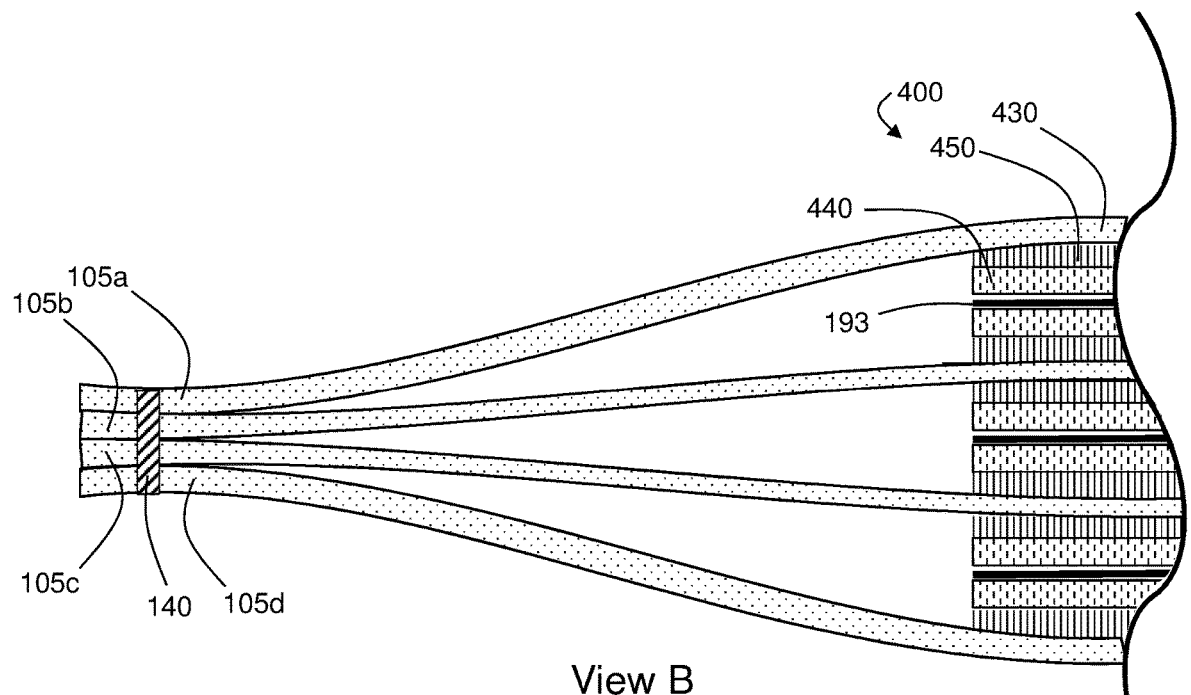
FIG. 11E is an exemplary schematic illustration of a cross-sectional view of the electrochemical device of FIG. 11B, according to certain embodiments.
Figure 11F:
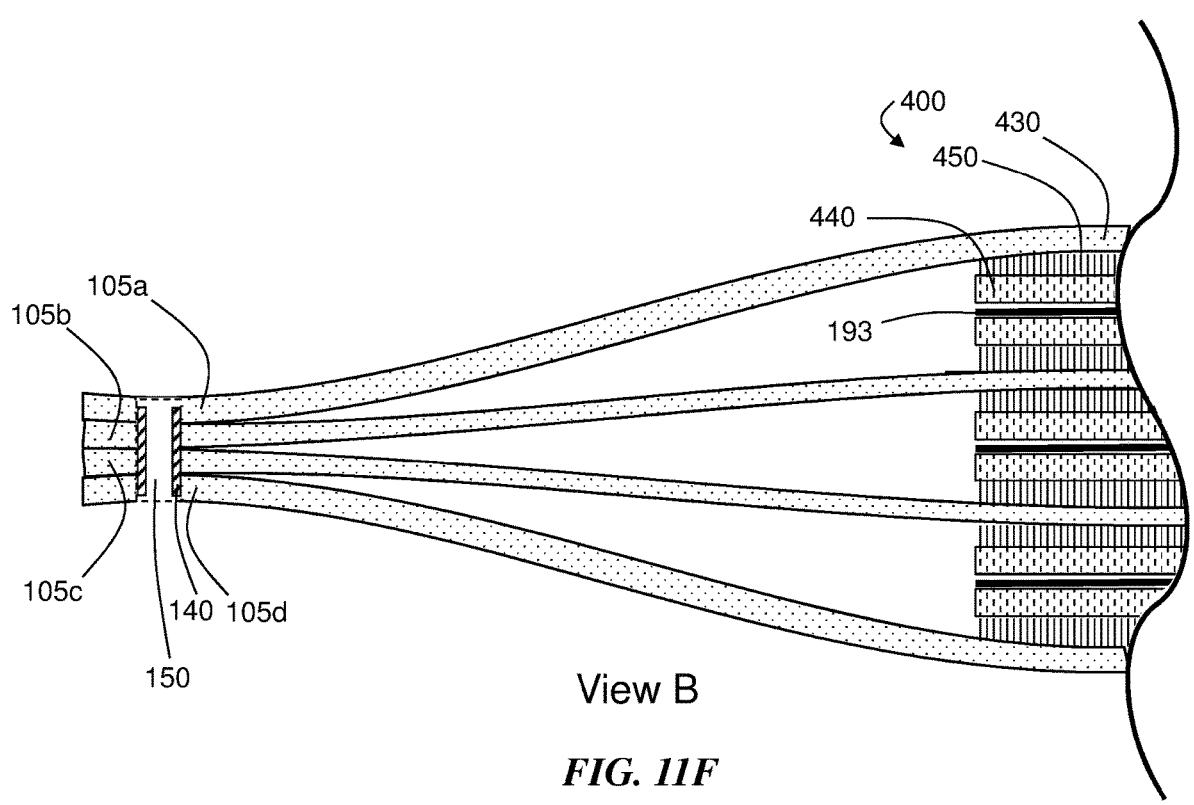
FIG. 11F is an exemplary schematic illustration of a cross-sectional view of the electrochemical device of FIG. 11B, according to certain embodiments.

FIG. 11D shows a schematic cross-sectional illustration of electrochemical device 400 as viewed from View B shown in FIG. 11B, in accordance with certain embodiments. As shown in FIG. 11D, double-sided anode portion 105*a* extends past the other components of electrochemical device 400, according to certain embodiments. It should be understood that each of double-sided anode portions 105 (e.g., double-sided anode portions 105*a*, 105*b*, 105*c*, and 105*d* in FIG. 11D) can look like double-sided electrode portion 105 in, for example FIGS. 5A-7B, and are shown as single layers in FIGS. 11A-11E for clarity of illustration. For example, in some embodiments, double-sided anode 105*a* in FIG. 11D comprises a first electrode portion, a second electrode portion, and an electrically non-conductive layer between the first electrode portion and the second electrode portion. In some embodiments, electrical coupling between double-sided anode portions 105*a*, 105*b*, 105*c*, and 105*d* can be established by penetrating double-sided anode portions 105*a*, 105*b*, 105*c*, and 105*d* and, in some cases, electrically conductive terminal 170 (when present). For example, as shown in FIG. 11E, in some cases, double-sided anode portions 105*a*, 105*b*, 105*c*, and 105*d* form part of an article as described herein, and are penetrated such that electrically conductive solid material region 140 extends from double-sided anode portion 105*a* to double-sided anode portion 105*d*, which may be useful in establishing a good electrical connection to the anodes (including anode 430) of electrochemical device 400. In some cases, as shown in FIG. 11F, penetrating double-sided anode portions 105*a*, 105*b*, 105*c*, and 105*d* results in the formation of cavity 150, which extends from double-sided anode portion 105*a* to double-sided anode portion 105*d*. In certain cases, at least a portion of a wall of cavity 150 comprises electrically conductive solid material region 140.

As mentioned above, some methods described herein may involve penetrating the articles described herein with solid objects (e.g., pins) that are configured to establish relatively efficient electrical coupling between the first electrode portion and the second electrode portion. In some cases, the objects are configured such that cavities and/or electrically conductive solid material regions formed during the methods described herein have certain shapes or geometries. For example, in some cases, methods described herein involve penetrating the article with certain cross-sectional shapes. In some embodiments, the article comprises a cavity or electrically conductive solid material region having a cross-section perpendicular to its length. The length of the cavity or electrically conductive solid material region refers to the dimension of the cavity or electrically conductive region that spans the electrode portions. For example, in FIG. 2, the length of electrically conductive solid material region 140 spans first electrode portion 110 and second electrode portion 120. In some embodiments, the cross-section of the cavity and/or electrically conductive solid material region is substantially parallel to the first side and the second side of the electrically non-conductive layer. Unexpectedly, it has been found that in some, but not necessarily all cases, penetrating the article with solid objects (e.g., pins) having certain shapes establishes more effective electrical coupling within the article than do other shapes, when taking cross-sectional area or largest cross-sectional dimension of the resulting cavity and/or electrically conductive solid material region into account. As mentioned above, the article may comprise a cavity extending from the first electrode portion, through the electrically non-conductive layer, and to the second electrode portion, wherein at least a portion of the electrically conductive solid material is positioned along the wall of the cavity. It has been observed, unexpectedly, that penetrating the article with solid objects (e.g., pins) having relatively high cross-sectional perimeter to cross-sectional area (perimeter-to-area) ratios leads to the arrangement of a relatively high amount of electrically conductive material on the wall of the cavity, which increases the effectiveness of the electronic coupling between electrode portions.

As such, in some, but not necessarily all cases, it may be beneficial to form cavities and/or electrically conductive solid material regions in the article with cross-sections that have a relatively high ratio of the perimeter of the cross-section to the area of the cross-section. Such a perimeter-to-area ratio may be tuned by choosing certain cross-sectional shapes of the objects used to penetrate the article. For example, a circle with an area of 0.95 mm$^2$ has a perimeter of 3.45 mm, giving a ratio of perimeter to area of 3.63 mm$^{-1}$, while a six-sided star (e.g., corresponding to a TORX® shape) having an area of 0.62 mm$^2$ can have a perimeter of 3.61, giving a ratio of perimeter to area of 5.8 mm$^{-1}$. Having a relatively high ratio of the perimeter of the cross-section to the area of the cross-section may provide for relatively efficient electrical coupling between portions connected by the cavity and/or electrically conductive solid material region (e.g., low electrical resistance) while at the same time maintaining a relatively small overall area of penetration, which may reduce structural perturbation to the article during the penetrating step and/or reduce a force required to penetrate the article. In some embodiments, the ratio of the perimeter of the cross-section to the area of the cross-section (e.g., of the cavity, electrically conductive solid material region, and/or object used to penetrate the article) is greater than or equal to 1 mm$^{-1}$, greater than or equal to 2 mm$^{-1}$, greater than or equal to 3 mm$^{-1}$, greater than or equal to 5 mm$^{-1}$, greater than or equal to 10 mm$^{-1}$, or greater. In some embodiments, the ratio of the perimeter of the cross-section to the area of the cross-section is less than or equal to 30 mm$^{-1}$, less than or equal to 25 mm$^{-1}$, less than or equal to 20 mm$^{-1}$, less than or equal to 15 mm$^{-1}$, or less. Combinations of these ranges are possible. For example, in some embodiments, the ratio of the perimeter of the cross-section to the area of the cross-section is greater than or equal to 1 mm$^{-1}$ and less than or equal to 30 mm$^{-1}$.

In some embodiments, the solid object used to penetrate the article (e.g., pin) has a cross-sectional shape chosen from square, rectangular, circular, ellipsoid, triangle, four-sided star, five-sided star, and six-sided star. In some embodiments, the article comprises a cavity and/or electrically conductive solid material region having a cross-sectional shape chosen from square, rectangular, circular, ellipsoid, triangle, four-sided star, five-sided star, and six-sided star. Penetrating the article with a solid object (e.g., pin) having a cross-sectional shape corresponding to the above shapes may, in some cases, result in the formation of a cavity and/or electrically conductive solid material region having a cross-sectional shape chosen from the list above.

In some embodiments, the solid object used to penetrate the article (e.g., pin) has a relatively small cross-sectional area. In some embodiments, the cavity and/or electrically conductive solid material region has a relatively small cross-sectional area. As mentioned above, having a relatively small cross-sectional area may be beneficial, in some, but not necessarily all cases by reducing structural perturbation of the article and/or reducing a force required to penetrate the article. In some embodiments, the solid object used to penetrate the article (e.g., pin) has a cross-sectional area of less than or equal to 25 mm$^2$, less than or equal to 5 mm$^2$, less than or equal to 1.0 mm$^2$, less than or equal to 0.5 mm$^2$, or less. In some embodiments, the solid object used to penetrate the article (e.g., pin) has a cross-sectional area that is greater than or equal to 0.005 mm$^2$, greater than or equal to 0.01 mm$^2$, greater than or greater than or equal to 0.1 mm$^2$, greater than or equal to 0.5 mm$^2$, or greater. In some embodiments, the cavity and/or electrically conductive solid material region has a cross-sectional area of less than or equal to 25 mm$^2$, less than or equal to 5 mm$^2$, less than or equal to 1.0 mm$^2$, less than or equal to 0.5 mm$^2$, or less. In some embodiments, the cavity and/or electrically conductive solid material region has a cross-sectional area that is greater than or equal to 0.005 mm$^2$, greater than or equal to 0.01 mm$^2$, greater than or greater than or equal to 0.1 mm$^2$, greater than or equal to 0.5 mm$^2$, or greater. Combinations of these ranges are possible. For example, in some embodiments the solid object used to penetrate the article (e.g., pin) has a cross-sectional area of greater than or equal to 0.005 mm$^2$ and less than or equal to 25 mm$^2$. In some embodiments, the cavity and/or electrically conductive solid material region has a cross-sectional area of greater than or equal to 0.005 mm$^2$ and less than or equal to 25 mm$^2$.

In some embodiments, the solid object used to penetrate the article (e.g., pin) has a relatively small largest cross-sectional dimension. In some embodiments, the cavity and/or electrically conductive solid material region may have a relatively small largest cross-sectional dimension. In some embodiments, the solid object used to penetrate the article (e.g., pin) has a largest cross-sectional dimension that is less than or equal to 5 mm, less than or equal to 2 mm, less than or equal to 1 mm, or less. In some embodiments, the object used to penetrate the article has a has a largest cross-sectional dimension that is greater than or equal to 0.1 mm, greater than or equal to 0.5 mm, greater than or equal to 0.8 mm, or greater. In some embodiments, the cavity and/or electrically conductive solid material region has a largest cross-sectional dimension that is less than or equal to 5 mm, less than or equal to 2 mm, less than or equal to 1 mm, or less. In some embodiments, the cavity and/or electrically conductive solid material region has a largest cross-sectional dimension that is greater than or equal to 0.1 mm, greater than or equal to 0.5 mm, greater than or equal to 0.8 mm, or greater. Combinations of these ranges are possible. For example, in some embodiments, the solid object used to penetrate the article (e.g., pin) has a largest cross-sectional dimension that is greater than or equal to 0.1 mm and less than or equal to 5 mm. In some embodiments, the cavity and/or electrically conductive solid material region has a largest cross-sectional dimension that is greater than or equal to 0.1 mm and less than or equal to 5 mm.

A variety of anode active materials are suitable for use with the electrode portions of the articles and electrochemical cells described herein, according to certain embodiments. In some embodiments, the anode active material comprises lithium (e.g., lithium metal), such as lithium foil, lithium deposited onto a conductive substrate or onto a non-conductive substrate (e.g., a release layer), and lithium alloys (e.g., lithium-aluminum alloys and lithium-tin alloys). Lithium can be contained as one film or as several films, optionally separated. Suitable lithium alloys for use in the aspects described herein can include alloys of lithium and aluminum, magnesium, silicium (silicon), indium, and/or tin. In some embodiments, the anode active material comprises lithium metal (e.g., lithium metal and/or a lithium metal alloy) during at least a portion of or during all of a charging and/or discharging process of an electrochemical cell.

In some embodiments, the anode active material contains at least 50 wt % lithium. In some cases, the anode active material contains at least 75 wt %, at least 90 wt %, at least 95 wt %, or at least 99 wt % lithium.

In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In certain cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In certain embodiments, the anode active material comprises silicon, lithium, and/or any alloys or combinations thereof. In certain embodiments, the anode active material comprises lithium titanate ($Li_4Ti_5O_{12}$, also referred to as "LTO"), tin-cobalt oxide, or any combinations thereof.

According to some embodiments, an electrode (e.g., lithium anode) of the article and/or electrochemical cell may comprise one or more coatings or layers formed from polymers, ceramics, and/or glasses. The coating may serve as a protective layer and may serve different functions. Those functions may include preventing the formation of dendrites during recharging which could otherwise cause short circuiting, preventing reaction of the electrode active material with electrolyte, and improving cycle life. Examples of such protective layers include those described in: U.S. Pat. No. 8,338,034 to Affinito et al. and U.S. Patent Publication No. 2015/0236322 to Laramie at al., each of which is incorporated herein by reference in its entirety for all purposes. Additional details regarding certain protective layers that may be used are described in more detail below.

A variety of cathode active materials are suitable for use with cathodes of the electrochemical cells described herein, according to certain embodiments. In some embodiments, the cathode active material comprises a lithium intercalation compound (e.g., a compound that is capable of reversibly inserting lithium ions at lattice sites and/or interstitial sites). In certain cases, the cathode active material comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x(LiMO_2)_{(1-x)}$ where M is one or more of Ni, Mn, and Co. For example, the layered oxide may be $(Li_2MnO_3)_{0.25}(LiNi_{0.3}Co_{0.15}Mn_{0.55}O_2)_{0.75}$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the cathode active material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the cathode active material is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xMn_{2-x}O_4$, also referred to as "LMNO"). A non-limiting example of a suitable LMNO compound is $LiNi_{0.5}Mn_{1.5}O_4$. In certain cases, the electroactive material of the second electrode comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the cathode active material comprises a conversion compound. For instance, the cathode may be a lithium conversion cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the cathode active material may be doped with one or more dopants to alter the electrical properties (e.g., electrical conductivity) of the cathode active material. Non-limiting examples of suitable dopants include aluminum, niobium, silver, and zirconium.

In some embodiments, the cathode active material may be modified by a surface coating comprising an oxide. Non-limiting examples of surface oxide coating materials include: MgO, $Al_2O_3$, $SiO_2$, $TiO_2$, $ZnO_2$, $SnO_2$, and $ZrO_2$. In some embodiments, such coatings may prevent direct contact between the cathode active material and the electrolyte, thereby suppressing side reactions.

In certain embodiments, the cathode active material comprises sulfur. In some embodiments, the cathode active material comprises electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least 40 wt % sulfur. In some cases, the electroactive sulfur-containing material comprises at least 50 wt %, at least 75 wt %, or at least 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130, each of which is incorporated herein by reference in its entirety for all purposes. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al., each of which is incorporated herein by reference in its entirety for all purposes. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al., each of which is incorporated herein by reference in its entirety for all purposes.

One or more electrodes may further comprise additional additives, such as conductive additives, binders, etc., as described in U.S. Pat. No. 9,034,421 to Mikhaylik et al.; and U.S. Patent Application Publication No. 2013/0316072, each of which is incorporated herein by reference in its entirety for all purposes.

In some embodiments, an electrode or an electrochemical cell includes one or more release layers. For example, in some cases, the electrically non-conductive layer described above (e.g., between the first electrode portion and the second electrode portion) may be or comprise a release layer. Release layers described herein can be configured to have one or more of the following features: relatively good adhesion to a first layer (e.g., an electrode active material, a current collector, or a substrate or other layer) but relatively moderate or poor adhesion to a second layer (e.g., a substrate, or in other embodiments, a current collector or other layer); high mechanical stability to facilitate delamination without mechanical disintegration; high thermal stability; and compatibility with processing conditions (e.g., deposition of layers on top of the release layer, as well as compatibility with techniques used to form the release layer). Release layers may be thin (e.g., less than 10 microns) to reduce overall weight (e.g., battery weight) if the release layer is incorporated into an electrochemical device (e.g., comprising an electrochemical cell). A release layer should generally also be smooth and uniform in thickness so as to facilitate the formation of uniform layers on top of the release layer. Furthermore, release layers should generally be stable in the electrolyte and should generally not interfere with the structural integrity of the electrodes in order for the electrochemical device to have a high electrochemical "capacity" or energy storage capability (i.e., reduced capacity fade). The use of release layers to remove a substrate from one or more components of an electrochemical cell are described in detail in U.S. patent application Ser. No. 12/862,513, filed on Aug. 24, 2010, entitled "Release System for Electrochemical Cells."

The release layer may be formed of, for example, a ceramic, a polymer, or a combination thereof. In some embodiments, the substrate and/or release layer comprises a polymeric material. In some cases, at least a portion of the polymeric material of the release layer is crosslinked; in other cases, the polymeric material(s) is substantially uncrosslinked. Examples of polymeric materials include, for example, hydroxyl-containing polymers such as poly vinyl alcohol (PVOH), polyvinyl butyral, polyvinyl formal, vinyl acetate-vinyl alcohol copolymers, ethylene-vinyl alcohol copolymers, and vinyl alcohol-methyl methacrylate copolymers.

The thickness of a release layer may vary over a range from 0.1 microns to 50 microns. For instance, the thickness of the release layer may be between 0.1-1 microns thick, between 0.1 and 2 microns thick, between 0.1 and 3 microns thick, between 1-5 microns thick, between 5-10 microns thick, between 5-20 microns thick, or between 10-50 microns thick. In certain embodiments, the thickness of a release layer is, e.g., 10 microns or less, 7 microns or less, 5 microns or less, 3 microns or less, 2.5 microns or less, 2 microns or less, 1.5 microns or less, 1 micron or less, or 0.5 microns or less. A relatively thicker release layer may be suitable for applications where the release layer is not incorporated into an electrochemical cell (e.g., it is released along with a carrier substrate), and a relatively thinner release layer may be desirable where the release layer is incorporated into the electrochemical cell.

The electrolytes used in electrochemical devices (e.g., electrochemical cells or battery cells) can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

In some embodiments, the electrolyte comprises a fluid that can be added at any point in the fabrication process. In some cases, the electrochemical cell may be fabricated by providing a cathode and an anode, applying an anisotropic force component normal to the active surface of the anode, and subsequently adding the fluid electrolyte such that the electrolyte is in electrochemical communication with the cathode and the anode. In other cases, the fluid electrolyte may be added to the electrochemical cell prior to or simultaneously with the application of the anisotropic force component, after which the electrolyte is in electrochemical communication with the cathode and the anode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes, for example, in lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, and lithium bis(fluorosulfonyl)imide (LiFSI). Other electrolyte salts that may be useful include lithium polysulfides (Li$_2$S$_x$), and lithium salts of organic polysulfides (LiS$_x$R)$_n$, where x is an integer from 1 to 20, n is an integer from 1 to 3, and R is an organic group, and those disclosed in U.S. Pat. No. 5,538,812 to Lee et al., which is incorporated herein by reference in its entirety for all purposes.

In some embodiments, the electrolyte comprises one or more room temperature ionic liquids. The room temperature ionic liquid, if present, typically comprises one or more cations and one or more anions. Non-limiting examples of suitable cations include lithium cations and/or one or more quaternary ammonium cations such as imidazolium, pyrrolidinium, pyridinium, tetraalkylammonium, pyrazolium, piperidinium, pyridazinium, pyrimidinium, pyrazinium, oxazolium, and trizolium cations. Non-limiting examples of suitable anions include trifluromethylsulfonate ($CF_3SO_3^-$), bis (fluorosulfonyl)imide ($N(FSO_2)_2^-$), bis (trifluoromethyl sulfonyl)imide (($CF_3SO_2)_2N^-$, bis (perfluoroethylsulfonyl) imide(($CF_3CF_2SO_2)_2N^-$ and tris(trifluoromethylsulfonyl) methide (($CF_3SO_2)_3C^-$. Non-limiting examples of suitable ionic liquids include N-methyl-N-propylpyrrolidinium/bis (fluorosulfonyl) imide and 1,2-dimethyl-3-propylimidazolium/bis(trifluoromethanesulfonyl)imide. In some embodiments, the electrolyte comprises both a room temperature ionic liquid and a lithium salt. In some other embodiments, the electrolyte comprises a room temperature ionic liquid and does not include a lithium salt.

In some embodiments, the article and/or electrochemical device may further comprise a separator between two electrode portions (e.g., an anode portion and a cathode portion). The separator may be a solid non-conductive or insulative material which separates or insulates the anode and the cathode from each other preventing short circuiting, and which permits the transport of ions between the anode and the cathode. In some embodiments, the porous separator may be permeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

The electrode portions described herein may comprise pores, according to certain embodiments. As used herein, a "pore" refers to a pore as measured using ASTM Standard Test D4284-07, and generally refers to a conduit, void, or passageway, at least a portion of which is surrounded by the medium in which the pore is formed such that a continuous loop may be drawn around the pore while remaining within the medium. Generally, voids within a material that are completely surrounded by the material (and thus, not accessible from outside the material, e.g., closed cells) are not considered pores within the context of the invention. It should be understood that, in cases where the article comprises an agglomeration of particles, pores include both the interparticle pores (i.e., those pores defined between particles when they are packed together, e.g. interstices) and intraparticle pores (i.e., those pores lying within the envelopes of the individual particles). Pores may comprise any suitable cross-sectional shape such as, for example, circular, elliptical, polygonal (e.g., rectangular, triangular, etc.), irregular, and the like.

The porosity of different portions of an electrode portion may be measured by physically separating the different regions, for example, cutting out the particular region of the electrode, and then measuring the separated portion using the above-referenced ASTM Standard Test D4284-07.

Layers of ceramic or other inorganic protective materials (e.g., glasses, glassy-ceramics) may be used to protect electrodes (e.g., lithium anodes) from adverse interaction with electrolyte material during operation of electrochemical cells. For example, protected lithium anode (PLA) structures may be employed.

A protective layer described herein can be formed of a variety of types of materials. In certain embodiments, the material from which the protective layer is formed may be selected to allow ions (e.g., electrochemically active ions, such as lithium ions) to pass through but to substantially impede electrons from passing across. By "substantially impedes," in this context, it is meant that in this embodiment the material allows lithium ion flux at least ten times greater than electron passage.

In some embodiments, the material used for a protective layer has a high enough conductivity (e.g., at least $10^{-6}$ S/cm, or another conductivity value described herein) in its first amorphous state. The material may also be chosen for its ability to form a smooth, dense and homogenous thin films, especially on a polymer layer such as a separator. Lithium oxysulfides may especially include these characteristics.

The protective layer can be configured to be substantially electronically non-conductive, in certain embodiments, which can inhibit the degree to which the ion conductor causes short circuiting of the electrochemical cell. In certain embodiments, all or part of the protective layer can be formed of a material with a bulk electronic resistivity of at least $10^4$ Ohm-meters, at least $10^5$ Ohm-meters, at least $10^{10}$ Ohm-meters, at least $10^{15}$ Ohm-meters, or at least $10^{20}$ Ohm-meters. The bulk electronic resistivity may be, in some embodiments, less than or equal to $10^{20}$ Ohm-meters, or less than or equal to $10^{15}$ Ohm-meters. Combinations of the above-referenced ranges are also possible. Other values of bulk electronic resistivity are also possible.

In some embodiments, the average ionic conductivity (e.g., lithium ion conductivity) of the protective layer material is at least $10^{-7}$ S/cm, at least $10^{-6}$ S/cm, at least $10^{-5}$ S/cm, at least $10^{-4}$ S/cm, at least $10^{-3}$ S/cm, at least $10^{-2}$ S/cm, at least $10^{-1}$ S/cm, at least 1 S/cm, or at least 10 S/cm. The average ionic conductivity may be less than or equal to 20 S/cm, less than or equal to 10 S/cm, or less than or equal to 1 S/cm. Conductivity may be measured at room temperature (e.g., 25 degrees Celsius).

In some embodiments, the protective layer can be a solid. In some embodiments, the protective layer comprises or may be substantially formed of a non-polymeric material. For example, the protective layer may comprise or may be substantially formed of an inorganic material.

Although a variety of materials can be used as an ion conductive layer, in one set of embodiments, the protective layer is an inorganic ion conductive layer. For example, the inorganic ion conductor layer may be a ceramic, a glass, or a glassy-ceramic. Suitable glasses include, but are not limited to, those that may be characterized as containing a "modifier" portion and a "network" portion, as known in the art. The modifier may include a metal oxide of the conductive metal ion in the glass. The network portion may include a metal chalcogenide such as, for example, a metal oxide or sulfide. Protective layers may include a glassy material selected from one or more of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. In some embodiments, the protective layer comprises an oxysulfide such as lithium oxysulfide. In one embodiment, the protective layer comprises a lithium phosphorus oxynitride in the form of an electrolyte.

In certain embodiments in which an inorganic ion conductor material described herein comprises a lithium oxysulfide, the lithium oxysulfide (or an ion conductor layer comprising a lithium oxysulfide) may have an oxide content between 0.1-20 wt %. The oxide content may be measured with respect to the total weight of the lithium oxysulfide material or the total weight of the ion conductor layer that comprises the lithium oxysulfide material. For instance, the oxide content may be at least 0.1 wt %, at least 1 wt %, at least 2 wt %, at least 5 wt %, at least 10 wt %, at least 15 wt %, or at least 20 wt %. In some embodiments, the oxide content may be less than or equal to 20 wt %, less than or equal to 15 wt %, less than or equal to 10 wt %, less than or equal to 5 wt %, less than or equal to 2 wt %, or less than or equal to 1 wt % of the lithium oxysulfide. Combinations of the above-noted ranges are also possible. The elemental composition, including oxide content, of a layer may be determined by methods such as energy-dispersive X-ray spectroscopy.

In some embodiments in which an inorganic ion conductor material described herein comprises a lithium oxysulfide, the lithium oxysulfide material (or an ion conductor layer comprising a lithium oxysulfide) has an atomic ratio of sulfur atoms to oxygen atoms (S:O) of between, for example, 0.5:1 to 1000:1. For instance, the atomic ratio between sulfur atoms to oxygen atoms (S:O) in the lithium oxysulfide material (or an ion conductor layer comprising a lithium oxysulfide) may be at least 0.5:1, at least 0.667:1, at least 1:1, at least 2:1, at least 3:1, at least 4:1, at least 5:1, at least 10:1, at least 20:1, at least 50:1, at least 70:1, at least 90:1, at least 100:1, at least 200:1, at least 500:1, or at least 1000:1. The atomic ratio of sulfur atoms to oxygen atoms (S:O) in the lithium oxysulfide material (or an ion conductor layer comprising a lithium oxysulfide) may be less than or equal to 1000:1, less than or equal to 500:1, less than or equal to 200:1, less than or equal to 100:1, less than or equal to 90:1, less than or equal to 70:1, less than or equal to 50:1, less than or equal to 20:1, less than or equal to 10:1, less than or equal to 5:1, less than or equal to 3:1, or less than or equal to 2:1. Combinations of the above-noted ranges are also possible (e.g., an atomic ratio of S:O of between 0.67:1 to 1000:1, or between 4:1 to 100:1). Other ranges are also possible. The elemental composition of a layer may be determined by methods such as energy-dispersive X-ray spectroscopy.

In some embodiments, a lithium oxysulfide material described herein may have a formula of $x(yLi_2S+zLi_2O)+ MS_2$ (where M is Si, Ge, or Sn), where y+z=1, and where x may range from 0.5-3. In certain embodiments, x is at least 0.5, at least 1.0, at least 1.5, at least 2.0, or at least 2.5. In other embodiments, x is less than or equal to 3.0, less than or equal to 2.5, less than or equal to 2.0, less than or equal to 1.5, less than or equal to 1.0, or less than or equal to 0.5. Combinations of the above-noted ranges are also possible. Other values for x are also possible.

The protective layer may comprise, in some embodiments, an amorphous lithium-ion conducting oxysulfide, a crystalline lithium-ion conducting oxysulfide or a mixture of an amorphous lithium-ion conducting oxysulfide and a crystalline lithium-ion conducting oxysulfide, e.g., an amorphous lithium oxysulfide, a crystalline lithium oxysulfide, or a mixture of an amorphous lithium oxysulfide and a crystalline lithium oxysulfide.

In some embodiments, the protective layer material, such as a lithium oxysulfide described above, comprises a glass forming additive ranging from 0 wt % to 30 wt % of the inorganic ion conductor material. Examples of glass forming additives include, for example, $SiO_2$, $Li_2SiO_3$, $Li_4SiO_4$, $Li_3PO_4$, $LiPO_3$, $Li_3PS_4$, $LiPS_3$, $B_2O_3$, $B_2S_3$. Other glass forming additives are also possible. In certain embodiments, glass forming additives may be at least 5 wt %, at least 10 wt %, at least 15 wt %, at least 20 wt %, at least 25 wt %, or at least 30 wt % of the inorganic ion conductor material. In certain embodiments, glass forming additives may be less than or equal to 30 wt %, less than or equal to 25 wt %, less than or equal to 20 wt %, less than or equal to 15 wt %, or less than or equal to 10 wt % of the inorganic ion conductor material. Combinations of the above-noted ranges are also possible. Other values of glass forming additives are also possible.

In some embodiments, one or more additional salts (e.g., lithium salts such as LiI, LiBr, LiCl, $Li_2CO_3$, or $Li_2SO_4$) may be added to the inorganic ion conductor material at a range of, e.g., 0 to 50 mol %. Other salts are also possible. In certain embodiments, additional salts are at least 0 mol %, at least 10 mol %, at least 20 mol %, at least 30 mol %, at least 40 mol %, or at least 50 mol %. In certain embodiments, additional salts are less than or equal to 50 mol %, less than or equal to 40 mol %, less than or equal to 30 mol %, less than or equal to 20 mol %, or less than or equal to 10 mol %. Combinations of the above-noted ranges are also possible. Other values of mol % are also possible.

Additional examples of protective layer materials include lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof.

In certain embodiments, the protective layer is formed of a single-ion conductive material (e.g., a single-ion conductive ceramic material).

Other suitable materials that could be used to form all or part of the protective layer include the ionically conductive materials described in U.S. Patent Publication No. 2010/0327811, filed Jul. 1, 2010 and published Dec. 30, 2010, entitled "Electrode Protection in Both Aqueous and Non-Aqueous Electromechanical Cells, Including Rechargeable Lithium Batteries," which is incorporated herein by reference in its entirety for all purposes.

Those of ordinary skill in the art, given the present disclosure, would be capable of selecting appropriate materials for use as the protective layer. Relevant factors that might be considered when making such selections include the ionic conductivity of the material; the ability to deposit, etch, or otherwise form the material on or with other materials in the electrochemical cell; the brittleness of the material; the compatibility of the material with the polymer or separator material; the compatibility of the material with the electrolyte of the electrochemical cell; the ion conductivity of the material (e.g., lithium ion conductivity); and/or the ability to adhere the material to the separator material.

The protective layer material may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc. In certain embodiments, at least a portion of the protective layer material may be etched or otherwise removed, after which a separator material (e.g., a polymeric separator material) may be formed over the protective layer material.

As described herein, in certain embodiments, a protective layer material can be deposited onto a separator using a vacuum deposition process (e.g., sputtering, CVD, thermal or E-beam evaporation). Vacuum deposition can permit the deposition of smooth, dense, and homogenous thin layers. In other embodiments, the ion conductor (e.g., ceramic) can be coated by drawing and casting the ion conductor from a slurry or gel.

In some embodiments (e.g., when the protective layer is a layer adjacent and/or attached to a polymer layer (e.g., a separator)), the thickness of the protective layer may vary. The thickness of the protective layer may vary over a range from, for example, 1 nm to 7 microns. For instance, the thickness of the ion conductor layer may be between 1-10 nm, between 10-100 nm, between 10-50 nm, between 30-70 nm, between 100-1000 nm, or between 1-7 microns. The thickness of an ion conductor layer may, for example, be less than or equal to 7 microns, less than or equal to 5 microns, less than or equal to 2 microns, less than or equal to 1000 nm, less than or equal to 600 nm, less than or equal to 500 nm, less than or equal to 250 nm, less than or equal to 100 nm, less than or equal to 70 nm, less than or equal to 50 nm, less than or equal to 25 nm, or less than or equal to 10 nm. In some embodiments, an ion conductor layer is at least 10 nm thick, at least 20 nm thick, at least 30 nm thick, at least 100 nm thick, at least 400 nm thick, at least 1 micron thick, at least 2.5 microns thick, or at least 5 microns thick. Other thicknesses are also possible. Combinations of the above-noted ranges are also possible.

The electrodes and energy storage devices described herein can be used for a wide variety of devices, such as, for example, electric vehicles, load-leveling devices (e.g., for solar- or wind-based energy platforms), portable electronic devices, and the like.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar.1, 2012, filed as application Ser. No. 13/216,559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr.18, 2013, filed as application Ser. No. 13/644,933 on Oct. 4, 2012, patented as U.S. Pat. No. 8.936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; and U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods".

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "directly adjacent", "immediately adjacent", "in direct contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

U.S. Provisional Application No. 62/851,162, filed May 22, 2019, and entitled "Electrically Coupled Electrodes, and Associated Articles and Methods" is incorporated herein by reference in its entirety for all purposes.

The following examples are intended to illustrate certain embodiments of the present invention, but do not exemplify the full scope of the invention.

EXAMPLES

In the following examples, articles comprising double-sided anodes were prepared by the following methods: anodes were formed by vacuum depositing a layer of lithium (having a thickness of 25 µm) onto a PVOH release layer (having a thickness of 6 µm) on a polyethylene terephthalate (PET) substrate. The lithium and the release layer were released from the PET substrate during assembly. Double-sided anode layers were assembled by stacking two anodes such that the accompanying release layer of each anode came into contact, with the two lithium layers facing away from each other. Stacks of the double-sided anodes were assembled and connected to a copper tab, and the assembly of the double-sided anodes and the copper tab were pierced by pins such that the pins traveled through multiple double-sided anodes.

The following examples describe the electrical resistances evaluated for these stacked double-sided anode and copper tab assemblies, as well as foil control assemblies. The foil control assemblies were constructed in the same manner as were the stacked double-sided anode and copper tab assemblies, except that a stack of layers of lithium metal foil was used instead of a stack double-sided anodes.

Example 1

In this example, the effect of the number of pins used to penetrate the stacked double-sided anode and copper tab assembly was evaluated. Sample 1 contained a stack of 41 double-sided anodes and a copper tab connected to the exterior of the stack, and sample 1 was penetrated by 6 pins. Sample 2 contained a stack of 41 double-sided anodes and a copper tab connected to the exterior of the stack, and sample 2 was penetrated by 12 pins. Comparative sample 1 was a foil control assembly that was not pierced by any pins. The electrical resistance for each of sample 1, sample 2, and comparative sample 3 was measured, and the results are reported in Table 1:

TABLE 1

| Sample | Number of Pins | Electrical Resistance (μΩ) |
| --- | --- | --- |
| 1 | 6 | 402.75 |
| 2 | 12 | 187.5 |
| Comparative 1 | Foil | 165 |

The results tabulated in Table 1 indicate that the resistance of the sample decreases as the number of pins used to penetrate the sample is increased. The resistance of sample 2 approaches that of comparative sample 1. These results show that relatively low resistances can be achieved for stacks of double-sided lithium even when the double-sided anodes of each comprises an electrically non-conductive release layer.

Example 2

In this example, the effect of the cross-sectional shape of the pins used to penetrate the stacked double-sided anode and copper tab assembly was evaluated. Sample 3 contained a stack of 21 double-sided anodes and a copper tab connected to the exterior of the stack, and sample 3 was penetrated by 6 pins having a circular cross-sectional shape. Sample 4 contained a stack of 21 double-sided anodes and a copper tab connected to the exterior of the stack, and sample 4 was penetrated by 6 pins having a TORX® cross-sectional shape. Comparative sample 2 was a foil control assembly that was not pierced by any pins. The electrical resistance for each of sample 3, sample 4, and comparative sample 2 was measured, and the results are reported in Table 2:

TABLE 2

| Sample | Cross-sectional Shape of Pins | Electrical Resistance (μΩ) |
| --- | --- | --- |
| 3 | Circular | 364.5 |
| 4 | TORX ® | 301 |
| Comparative 2 | Foil | 291 |

The results tabulated in Table 2 indicate that the resistance of the sample decreases when pins having a TORX® cross-sectional shape are used to penetrate the sample compared to when pins having a circular cross-sectional shape are used to penetrate the sample. The resistance of sample 4 approaches that of comparative sample 2. These results show that using pins with a relatively high perimeter-to-area ratio (such as a TORX® compared to a circle) can lead to decreased electrical resistance in the article.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
    penetrating a portion of an article comprising:
        an electrically non-conductive layer comprising a first side and a second side that is penetrated during the penetrating;
        a first electrode portion adjacent to the first side of the electrically non-conductive layer, wherein the first electrode portion comprises a first electrode active material that is an electrochemically active species that is penetrated during the penetrating; and
        a second electrode portion adjacent to the second side of the electrically non-conductive layer, wherein the second electrode portion comprises a second electrode active material that is an electrochemically active species that is penetrated during the penetrating, such that the penetrating causes the formation of an electrically conductive solid material region extending from the first electrode portion, through the electrically non-conductive layer, and to the second electrode portion,
    wherein:
        the first electrode active material of the first electrode portion is the same as the second electrode active material of the second electrode portion,
        the electrically conductive solid material region also comprises electrode active material that is the same as the electrode active material present in the first electrode portion and the second electrode portion, and
        the electrically conductive solid material region electrically couples the first electrode portion and the second electrode portion.

2. The method of claim 1, wherein the penetrating comprises piercing the article with a solid object.

3. The method of claim 2, wherein the solid object is or comprises a pin.

4. The method of claim 2, further comprising removing the solid object.

5. The method of claim 1, wherein the first electrode portion has a polarity, and the second electrode portion has a polarity that is the same as the polarity of the first electrode portion.

6. The method of claim 5, wherein a portion of the first electrode portion or the second electrode portion is covered by a third electrode portion, wherein the third electrode portion has a polarity that is opposite of the polarity of the first electrode portion and the second electrode portion.

7. The method of claim 1, wherein the penetrating causes the formation of a cavity extending from the first electrode portion, through the electrically non-conductive layer, and to the second electrode portion.

8. The method of claim 7, wherein at least a portion of the electrically conductive solid material is positioned along a wall of the cavity.

9. The method of claim 7, further comprising filling at least a portion of the cavity with an electrically conductive material.

10. The method of claim 7, wherein the cavity has a cross-section perpendicular to its length, and the ratio of the perimeter of the cross-section to the area of the cross-section is greater than or equal to 1 mm$^{-1}$ and less than or equal to 30 mm$^{-1}$.

11. The method of claim 7, wherein the cavity is a first cavity, and the article further comprises a second cavity.

12. The method of claim 7, wherein the article comprises a first side and a second side opposite the first side, and the cavity extends from the first side to the second side.

13. The method of claim 1, wherein the first electrode active material, the second electrode active material, and the electrically conductive solid material region comprise lithium metal.

14. The method of claim 13, wherein the lithium metal is part of a lithium metal alloy.

15. The method of claim 1, wherein the electrically conductive solid material region has a cross-section perpendicular to its length, and the ratio of the perimeter of the cross-section to the area of the cross-section is greater than or equal to 1 mm$^{-1}$ and less than or equal to 30 mm$^{-1}$.

16. The method of claim 1, wherein the electrically non-conductive layer, the first electrode portion, and the second electrode portion form a first double-sided electrode portion, and the article further comprises a second double-sided electrode portion adjacent to the first double-sided electrode portion.

17. The method of claim 16, wherein:
    the penetrating causes the formation of an electrically conductive solid material region extending from the first electrode portion, through the electrically non-conductive layer, and to the second electrode portion, wherein the electrically conductive solid material region electrically couples the first electrode portion and the second electrode portion; and
    the first double-sided electrode portion is electrically coupled to the second double-sided electrode portion by the electrically conductive solid material region.

18. The method of claim 16, wherein:
    the penetrating causes the formation of a cavity extending from the first electrode portion, through the electrically non-conductive layer, and to the second electrode portion; and the cavity extends through the first double-sided electrode portion and the second double-sided electrode portion in a direction normal to the first side and the second side of each electrically non-conductive layer.

19. The method of claim 16, wherein:
the penetrating causes the formation of an electrically conductive solid material region extending from the first electrode portion, through the electrically non-conductive layer, and to the second electrode portion, wherein the electrically conductive solid material region electrically couples the first electrode portion and the second electrode portion; and
the electrically conductive solid material region extends through the first double-sided electrode portion and the second double-sided electrode portion in a direction normal to the first side and the second side of each electrically non-conductive layer.

20. The method of claim 16, further comprising a third electrode portion disposed between a portion of the first double-sided electrode portion and a portion of the second double-sided electrode portion, wherein the third electrode portion has a polarity that is different than the polarity of an electrode portion of the first double-sided electrode portion and an electrode portion of the second double-sided electrode portion.

21. The method of claim 1, wherein the electrically conductive solid material region is a first electrically conductive solid material region, and the article further comprises a second electrically conductive solid material region.

22. The method of claim 1, wherein the article comprises a first side and a second side opposite the first side, and the electrically conductive solid material region extends from the first side to the second side.

23. The method of claim 1, wherein the electrically non-conductive layer comprises a release layer.

24. The method of claim 1, further comprising a liquid electrolyte in electrochemical communication with the first electrode portion and/or the second electrode portion.

25. The method of claim 1, wherein the article is a part of an electrochemical device.

26. The method of claim 25, wherein the article is electrically coupled to an electrically conductive terminal of the electrochemical device.

27. The method of claim 25, wherein the electrochemical device is part of a rechargeable battery.

28. The method of claim 25, wherein the electrochemical device is a part of an electric vehicle.

29. A method comprising:
penetrating a portion of an article comprising:
an electrically non-conductive layer comprising a first side and a second side that is penetrated during the penetrating;
a first electrode portion adjacent to the first side of the electrically non-conductive layer, wherein the first electrode portion comprises a first electrode active material that is an electrochemically active species that is penetrated during the penetrating; and
a second electrode portion adjacent to the second side of the electrically non-conductive layer, wherein the second electrode portion comprises a second electrode active material that is an electrochemically active species that is penetrated during the penetrating,
such that an electrical coupling between the first electrode portion and the second electrode portion is established, wherein the penetrating causes the formation of a cavity extending from the first electrode portion, through the electrically non-conductive layer, and to the second electrode portion; and
filling at least a portion of the cavity with an electrically conductive material.

30. The method of claim 29, wherein the first electrode active material comprises lithium metal.

31. The method of claim 30, wherein the second electrode active material comprises lithium metal.

32. A method comprising:
penetrating a portion of an article by piercing the article with a solid object, wherein the article comprises:
an electrically non-conductive layer comprising a first side and a second side that is penetrated during the penetrating;
a first electrode portion adjacent to the first side of the electrically non-conductive layer, wherein the first electrode portion comprises a first electrode active material that is an electrochemically active species that is penetrated during the penetrating; and
a second electrode portion adjacent to the second side of the electrically non-conductive layer, wherein the second electrode portion comprises a second electrode active material that is an electrochemically active species that is penetrated during the penetrating,
such that an electrical coupling between the first electrode portion and the second electrode portion is established; and
removing the solid object.

33. The method of claim 32, wherein the first electrode active material comprises lithium metal.

34. The method of claim 33, wherein the second electrode active material comprises lithium metal.

35. A method comprising:
penetrating a portion of an article comprising:
an electrically non-conductive layer comprising a first side and a second side that is penetrated during the penetrating;
a first electrode portion adjacent to the first side of the electrically non-conductive layer, wherein the first electrode portion comprises a first electrode active material that is an electrochemically active species that is penetrated during the penetrating; and
a second electrode portion adjacent to the second side of the electrically non-conductive layer, wherein the second electrode portion comprises a second electrode active material that is an electrochemically active species that is penetrated during the penetrating,
such that an electrical coupling between the first electrode portion and the second electrode portion is established, and
wherein the electrically non-conductive layer, the first electrode portion, and the second electrode portion form a first double-sided electrode portion, and the article further comprises a second double-sided electrode portion adjacent to the first double-sided electrode portion.

36. The method of claim 35, wherein the penetrating causes the formation of an electrically conductive solid material region extending from the first electrode portion, through the electrically non-conductive layer, and to the second electrode portion, wherein the electrically conductive solid material region electrically couples the first electrode portion and the second electrode portion.

37. The method of claim 35, wherein the first electrode active material of the first electrode portion is the same as the second electrode active material of the second electrode portion.

38. The method of claim 1, wherein the first electrode active material and the second electrode active material comprise lithium metal.

39. The method of claim 38, wherein the lithium metal is part of a lithium metal alloy.

40. The method of claim 35, wherein the first electrode active material comprises lithium metal.

41. The method of claim 40, wherein the lithium metal is part of a lithium metal alloy.

42. The method of claim 35, wherein the second electrode active material comprises lithium metal.

43. The method of claim 42, wherein the lithium metal is part of a lithium metal alloy.

* * * * *